Sept. 2, 1958     M. E. KROM ET AL     2,850,577
LINE CONCENTRATOR SYSTEM
Filed Oct. 4, 1955     17 Sheets-Sheet 1

INVENTORS M. E. KROM
M. POSIN
BY
*Sn Turner*
ATTORNEY

INVENTORS M. E. KROM
M. POSIN
BY
ATTORNEY

INVENTORS: M. E. KROM
M. POSIN
BY
*[signature]*
ATTORNEY

INVENTORS M. E. KROM
M. POSIN
BY
ATTORNEY

Sept. 2, 1958     M. E. KROM ET AL     2,850,577
LINE CONCENTRATOR SYSTEM
Filed Oct. 4, 1955     17 Sheets-Sheet 11

INVENTORS M. E. KROM
M. POSIN
BY
ATTORNEY

INVENTORS: M. E. KROM
M. POSIN
BY
ATTORNEY

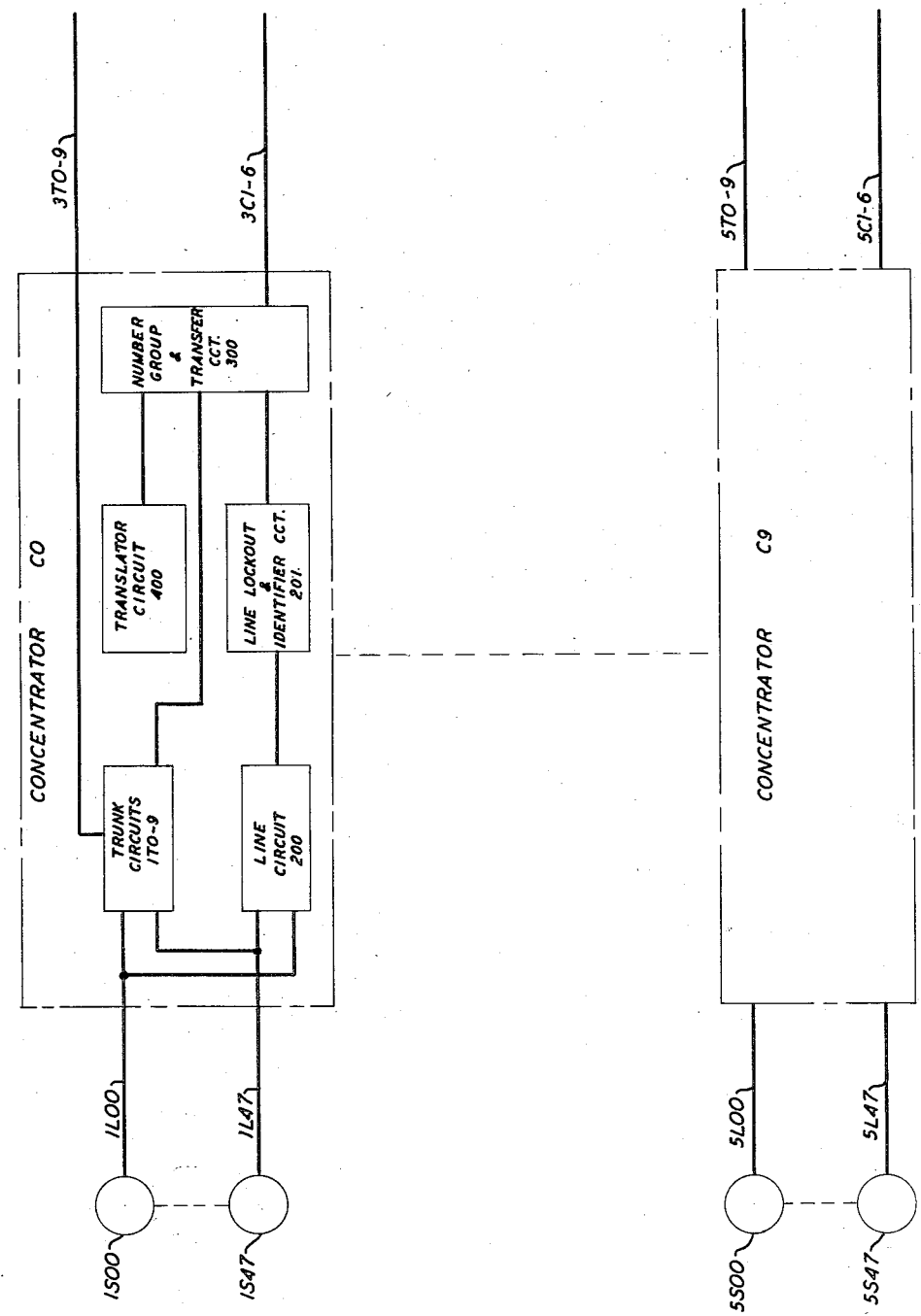

Sept. 2, 1958　　　M. E. KROM ET AL　　　2,850,577
LINE CONCENTRATOR SYSTEM
Filed Oct. 4, 1955　　　17 Sheets-Sheet 17

FIG. 20

|   | 3C2 | 3C3 | 3C4 | RELAYS |
|---|---|---|---|---|
| 0 |   | + | + | 14NT4, 14NT7 |
| 1 | −+ |   |   | 14NT0, 14NT1 |
| 2 | − | − |   | 14NT0, 14NT2 |
| 3 | + | − |   | 14NT1, 14NT2 |
| 4 | − | + |   | 14NT0, 14NT4 |
| 5 | + | + |   | 14NT1, 14NT4 |
| 6 | − | −+ |   | 14NT2, 14NT4 |
| 7 |   |   | + | 14NT0, 14NT7 |
| 8 | + |   | + | 14NT1, 14NT7 |
| 9 |   | − | + | 14NT2, 14NT7 |

FIG. 19

| SIGNALS FROM CENTRAL OFF. TO CONCENTRATOR | | | | | |
|---|---|---|---|---|---|
| LINE NO. | 3C1 | 3C2 | 3C3 | 3C4 | CIRCUIT 500 |
| 00 OR 24 | 4A+ |   | 4C+ |   | $E_0$ OR $E_3$ & $U_0$ |
| 01 OR 25 | 4A+ |   | 4C− |   | $E_0$ OR $E_3$ & $U_1$ |
| 02 OR 26 | 4A+ |   |   | 4D+ | $E_0$ OR $E_3$ & $U_2$ |
| 03 OR 27 | 4A+ |   |   | 4D− | $E_0$ OR $E_3$ & $U_3$ |
| 04 OR 28 | 4A− |   | 4C+ |   | $E_0$ OR $E_3$ & $U_4$ |
| 05 OR 29 | 4A− |   | 4C− |   | $E_0$ OR $E_3$ & $U_5$ |
| 06 OR 30 | 4A− |   |   | 4D+ | $E_0$ OR $E_3$ & $U_6$ |
| 07 OR 31 | 4A− |   |   | 4D− | $E_0$ OR $E_3$ & $U_7$ |
| 08 OR 32 |   | 4B+ | 4C+ |   | $E_1$ OR $E_4$ & $U_0$ |
| 09 OR 33 |   | 4B+ | 4C− |   | $E_1$ OR $E_4$ & $U_1$ |
| 10 OR 34 |   | 4B+ |   | 4D+ | $E_1$ OR $E_4$ & $U_2$ |
| 11 OR 35 |   | 4B+ |   | 4D− | $E_1$ OR $E_4$ & $U_3$ |
| 12 OR 36 |   | 4B− | 4C+ |   | $E_1$ OR $E_4$ & $U_4$ |
| 13 OR 37 |   | 4B− | 4C− |   | $E_1$ OR $E_4$ & $U_5$ |
| 14 OR 38 |   | 4B− |   | 4D+ | $E_1$ OR $E_4$ & $U_6$ |
| 15 OR 39 |   | 4B− |   | 4D− | $E_1$ OR $E_4$ & $U_7$ |
| 16 OR 40 | 4A+ | 4B+ |   |   | $E_2$ OR $E_5$ & $U_0$ |
| 17 OR 41 | 4A+ | 4B− |   |   | $E_2$ OR $E_5$ & $U_1$ |
| 18 OR 42 |   |   | 4C+ | 4D+ | $E_2$ OR $E_5$ & $U_2$ |
| 19 OR 43 |   |   | 4C+ | 4D− | $E_2$ OR $E_5$ & $U_3$ |
| 20 OR 44 | 4A− |   |   |   | $E_2$ OR $E_5$ & $U_4$ |
| 21 OR 45 | 4A− |   |   |   | $E_2$ OR $E_5$ & $U_5$ |
| 22 OR 46 |   |   | 4C− | 4D+ | $E_2$ OR $E_5$ & $U_6$ |
| 23 OR 47 |   |   | 4C− | 4D− | $E_2$ OR $E_5$ & $U_7$ |

FIG. 18

| SIGNALS FROM CONCENTRATOR TO C.O. | | | | | |
|---|---|---|---|---|---|
|   | 3C1 | 3C2 | 3C3 | 3C4 | 3C5 |
| LT0 | + |   |   |   |   |
| LT1 | −+ |   |   |   |   |
| LT2 | − |   |   |   |   |
| LT3 | + |   |   |   |   |
| LT4 | − |   |   |   |   |
| LU0 |   | + |   |   |   |
| LU1 |   | − |   |   |   |
| LU2 |   | − |   |   |   |
| LU3 |   | + | −+ |   |   |
| LU4 |   | − | − |   |   |
| LU5 |   |   | + | + |   |
| LU6 |   |   | − | − |   |
| LU7 |   |   | + | − | + |
| LU8 |   |   | − | −+ | + |
| LU9 |   |   |   | − | + |

INVENTORS: M. E. KROM
M. POSIN
BY
ATTORNEY

United States Patent Office 2,850,577
Patented Sept. 2, 1958

2,850,577

LINE CONCENTRATOR SYSTEM

Myron E. Krom, Convent Station, N. J., and Melvin Posin, New York, N. Y., assignors to Bell Telephone Laboratories, Incorporated, New York, N. Y., a corporation of New York Application October 4, 1955, Serial No. 538,333

31 Claims. (Cl. 179—22)

This invention relates to telephone systems and more particularly to subscriber line concentrating systems.

Each subscriber station, or substation, normally requires a pair of wires to connect it with the central office. For a substation which is located at a considerable distance from the central office the cost of these wires is substantial. In fact, in the present day telephone plant a large portion of the cost of installation and operation is that of the wire used in the subscriber loops between the substations and the central office. The utilization of line concentrating systems is attractive where the outside plant costs are high and the distances between groups of substations and the central office are large while the number of substations and the amount of local interconnecting traffic among the substations is not adequate to justify their connection to a separate community dial office.

As the central office is not directly in information communication with the subscriber lines due to the interposition of the remote line concentrator, it is generally necessary in such systems to provide a number of control leads to effect test and control functions. In order to obtain the greatest saving in the telephone plant it is desirable to have a high ratio between the subscriber and trunk lines connected to a remote line concentrator while keeping the number of control leads required to pass information signals to and from the concentrator to a minimum.

It is a general object of this invention to provide an improved communication system in which a large number of subscriber lines may be individually connected to a central office by a smaller number of common trunk lines whereby considerable saving is attained.

Another object of the present invention is to provide a line concentrator system which effects economies in the wiring connecting central offices with subscribers' substations.

In crossbar telephone systems of the type described in the Patent 2,585,904, which was granted to A. J. Busch on February 19, 1952, two basic types of switching frames are utilized. These frames, which are designated line link frames and trunk link frames, are interconnected by a network of junctors. Subscriber lines are associated with the line link frames and all types of outgoing and incoming trunks, as well as originating registers for supplying dial tone and storing dialed numbers, are associated with the trunk link frames. Through this system of line and trunk link frames traffic flows in two directions: originating calls from a subscriber line appearance on a line link frame to a trunk appearance on a trunk link frame; and terminating calls from a trunk appearance on a trunk link frame to a line appearance on a line link frame. The establishment of all such connections is controlled by common circuits called markers, and the line and trunk link frames served by a group of markers represents a switching unit called a marker group.

The number of markers in a marker group may vary from three to twelve depending upon the number of lines and trunks connected to the frames in the group. The marker holding time for establishing the connections for an originating or terminating call should be kept to a minimum because of the high apparatus cost. In the crossbar system described in the above-identified patent to Busch, for example, marker holding time is valued at approximately sixty dollars per millisecond per marker. Concentrating systems, due to the necessity for passing information signals to and from the concentrator, tend to increase the marker holding time for establishing a connection and thereby tend to require additional markers in the marker group.

It is an object of the present invention to provide a concentrating system for a crossbar type telephone system which does not materially increase the marker holding time.

This object is one of several objectives of the present invention which are factors in determining the type of signaling between the concentrators and the central office. Some of the other objects are to minimize changes in the standard crossbar equipment, to keep the number of control leads to a minimum, to utilize minimum potential sources at the concentrators, to minimize power dissipation through the connecting trunks and control pairs, and to provide for no-test connections to the subscriber lines.

These objects are accomplished by an illustrative embodiment of the line concentrating system of the present invention wherein each vertical group of the primary line link switch becomes one of ten concentrators which is connected by ten trunks and three control pairs to the central office. When a call is originated on one of the subscriber lines connected to a concentrator, the concentrator transmits signals representing the identity of the calling line, as a service request, over the three control pairs to a central office control circuit. The signaling from the concentrator is on an alternating simplex code basis with the source of alternating current being located at the central office. The central office control circuit receives the transmitted signals, calls in a marker and supplies to the marker a translation, in a decimal code, of the transmitted signals. The marker selects an idle one of the ten trunks which connect the concentrator with the central office, selects an idle originating register, and supplies the identity of the calling subscriber back to the control circuit. The control circuit concurrently transmits a direct-current connect potential over the tip and ring of the selected trunk and direct-current coded signals representing the identity of the calling line over the control pair to the concentrator in order to connect the calling line to the selected trunk. When the control circuit has checked that the selected trunk is connected to the calling line, it connects the register to the selected trunk. Terminating calls provide for substantially similar operation commencing with calling in a marker.

The utilization of alternating-current simplex signals from the concentrator to the central office and direct-current signals from the central office to the concentrator is an important feature of the present invention. By utilizing alternating-current simplex signaling from the concentrator, a multiplicity of potential sources at the concentrator is avoided, together with the power dissipation necessary for supplying these potentials from the central office. By utilizing rapid direct-current coded signaling from the central office, marker holding time is not materially increased.

Another feature of the present invention is that all types of party lines, which may be utilized in crossbar systems of the type described in the above-identified patent to Busch, may be readily utilized. In a system using a direct-current connect potential over both tip and ring of a selected trunk, positive or negative superimposed ringing tone or coded ringing does not interfere with concentrator operation, or provide false connections.

A further feature of the present invention pertains to means at the central office for checking a crosspoint closure at the concentrator. A concentrator crosspoint is a concentrator line-to-trunk connection, with the trunk interconnecting the concentrator with the central office.

A further feature of the present invention relates to means for establishing a call-back connection to a calling line. After dial tone has been provided and the desired number dialed, the line-to-originating register connection is disconnected and a line-to-outgoing trunk connection is automatically established.

A still further feature of the present invention resides in the provision, over the trunk, of a direct-current disconnect signal which is similar to the connect signal without the simultaneous signals over the control pairs. Means are provided at the central office to delay sending a disconnect signal while a call is being served and to delay serving a call while a disconnect signal is being sent.

Still another feature of the present invention relates to a line lockout and identifier circuit which simultaneously identifies a calling subscriber and locks out the others.

Yet a further feature of the present invention pertains to means at the concentrator for signaling the identity of utilized trunks over the control pair when a no-test connection is desired. By utilizing these signals, a no-test connection may be established to a line independently of its service condition.

Further objects and features will become apparent to those skilled in the art upon consideration of the following description read in connection with the drawing wherein:

Figs. 1 through 14, when arranged in accordance with Fig. 15, are circuit representations of a line concentrating system illustrative of the present invention, wherein Fig. 1 illustrates the trunk circuits in the concentrator of the present invention;

Fig. 15 illustrates the arrangement of Figs. 1 through 14;

Figure 17:
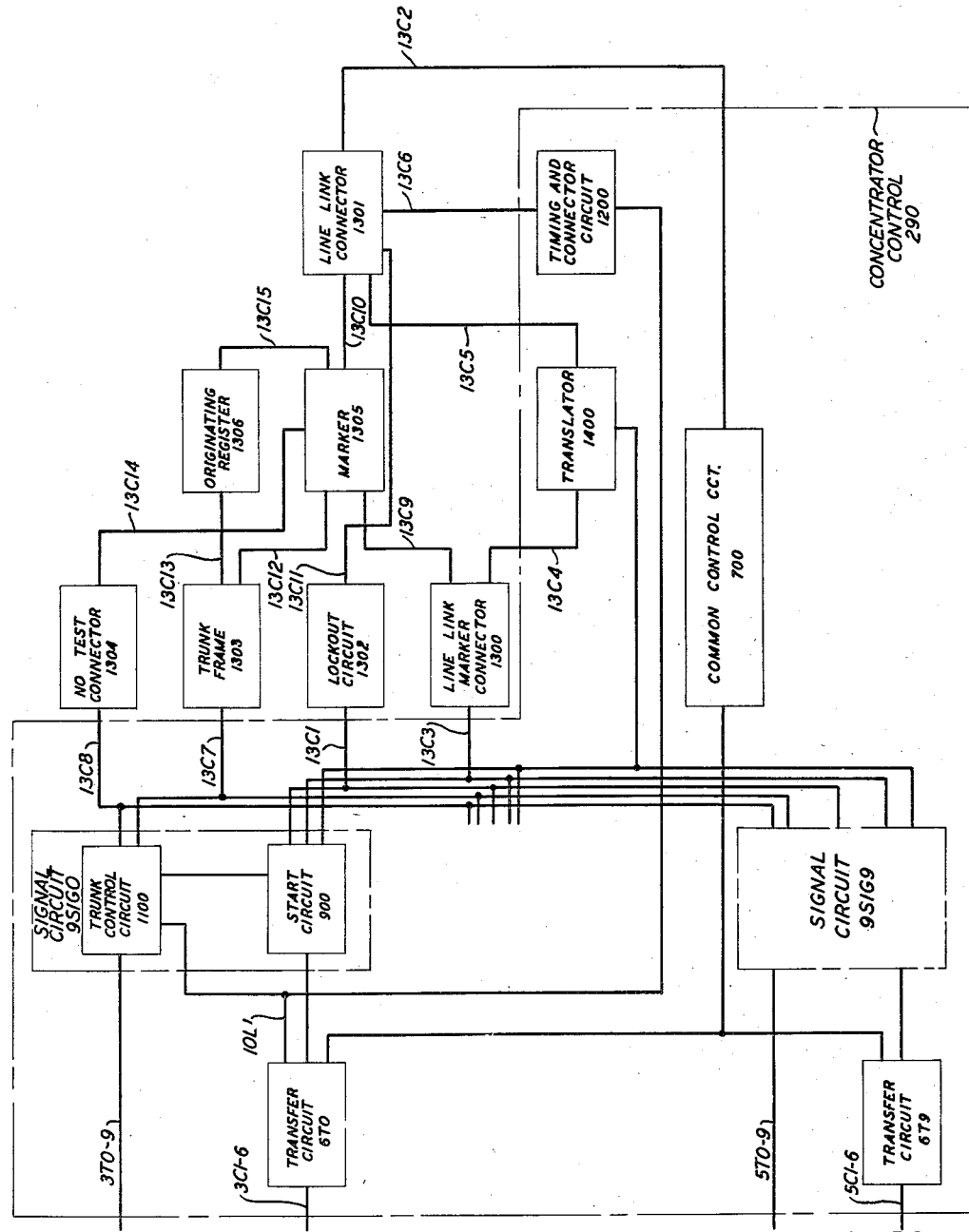

Figs. 16 and 17, when arranged with Fig. 16 to the left, are a box or functional diagram of the concentrator system of the present invention;

Fig. 18 is a table illustrating the alternating-current simplex signals from the concentrator to the central office;

Fig. 19 is a table illustrating the direct-current signals from the central office to the concentrator; and Fig. 20 is a table illustrating the alternating-current signals from the concentrator for no-test calls.

Figure 1:
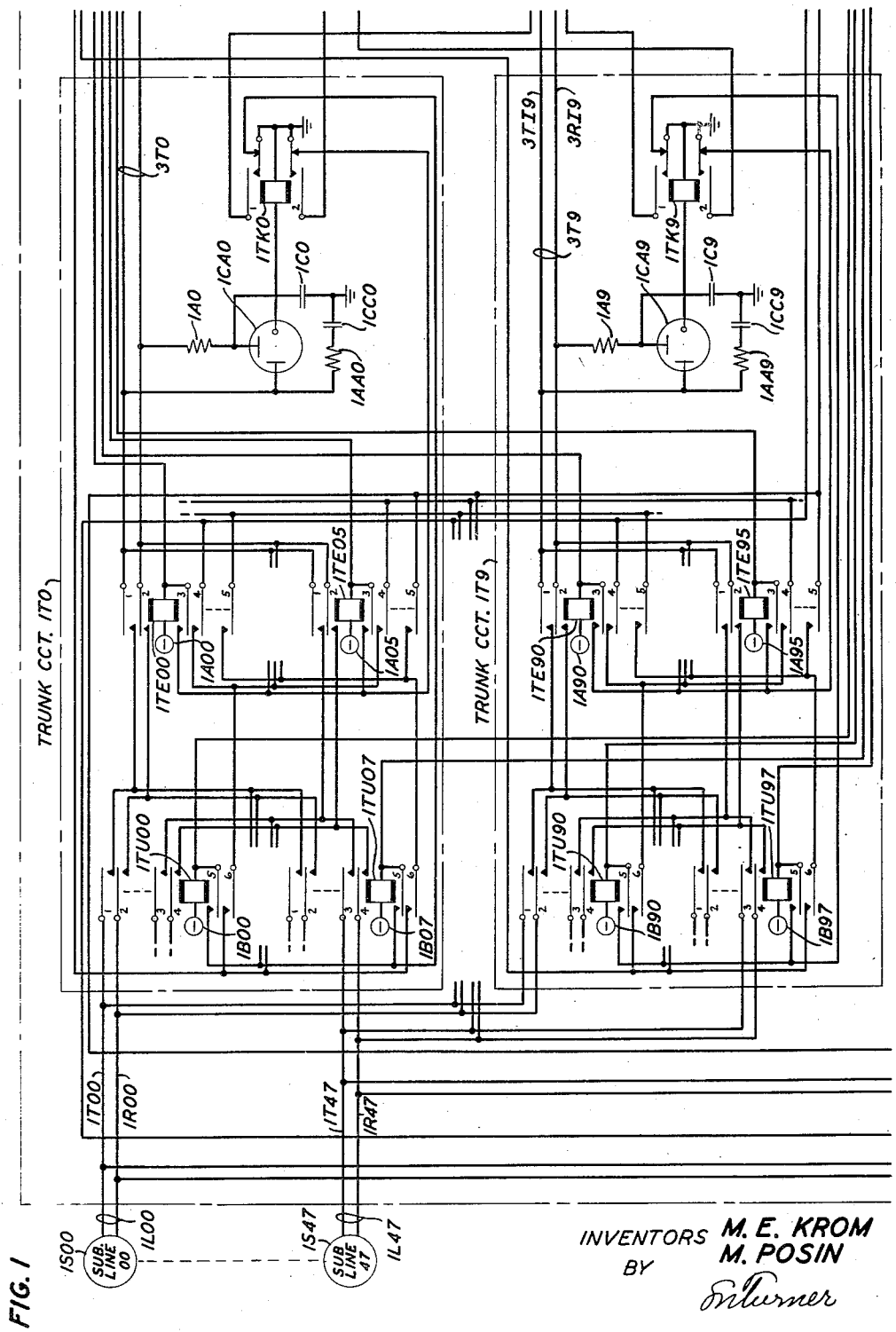
Figure 2:
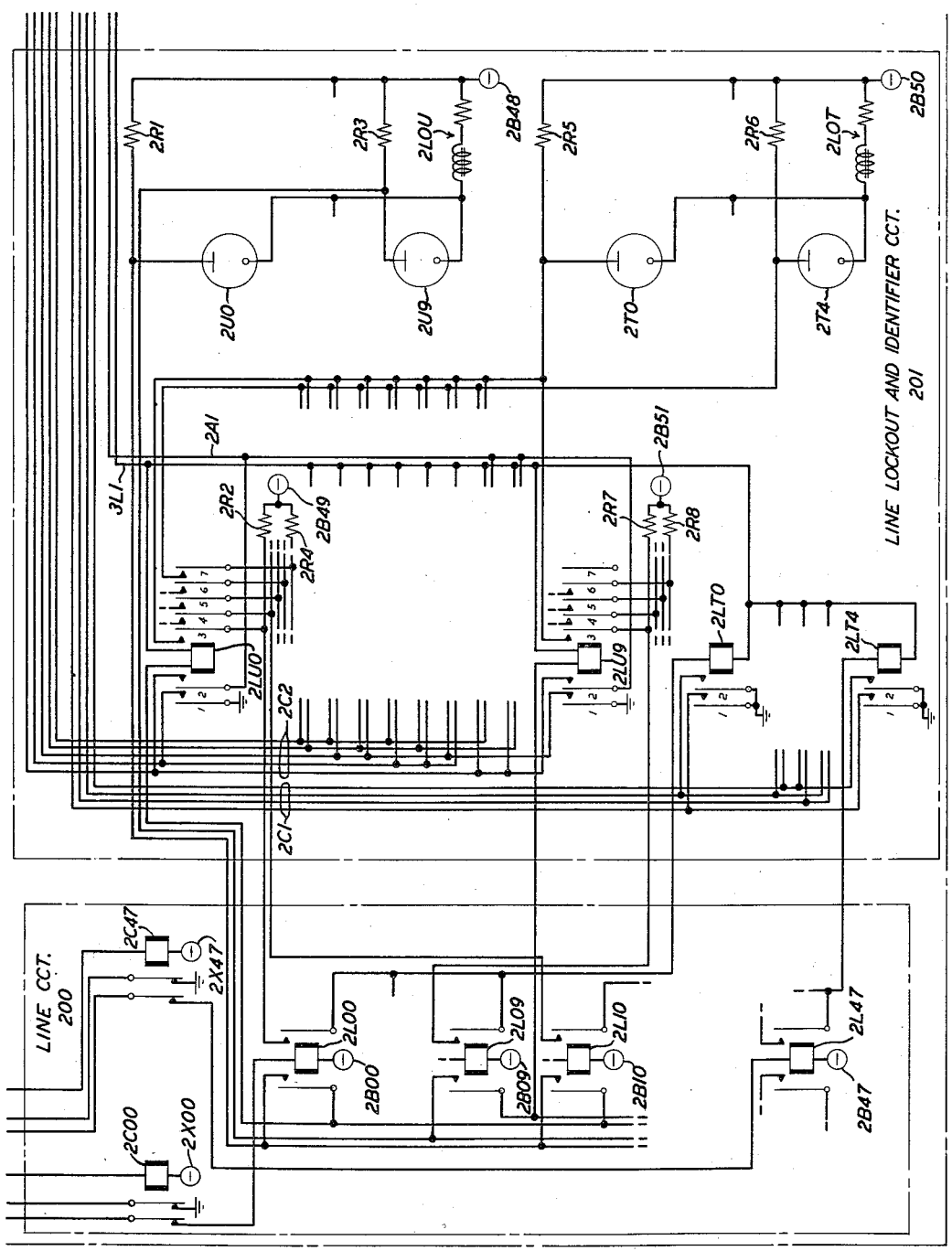
Fig. 2 illustrates the line circuit and line lockout and identifying circuit in the concentrator of the present invention.
Figure 3:
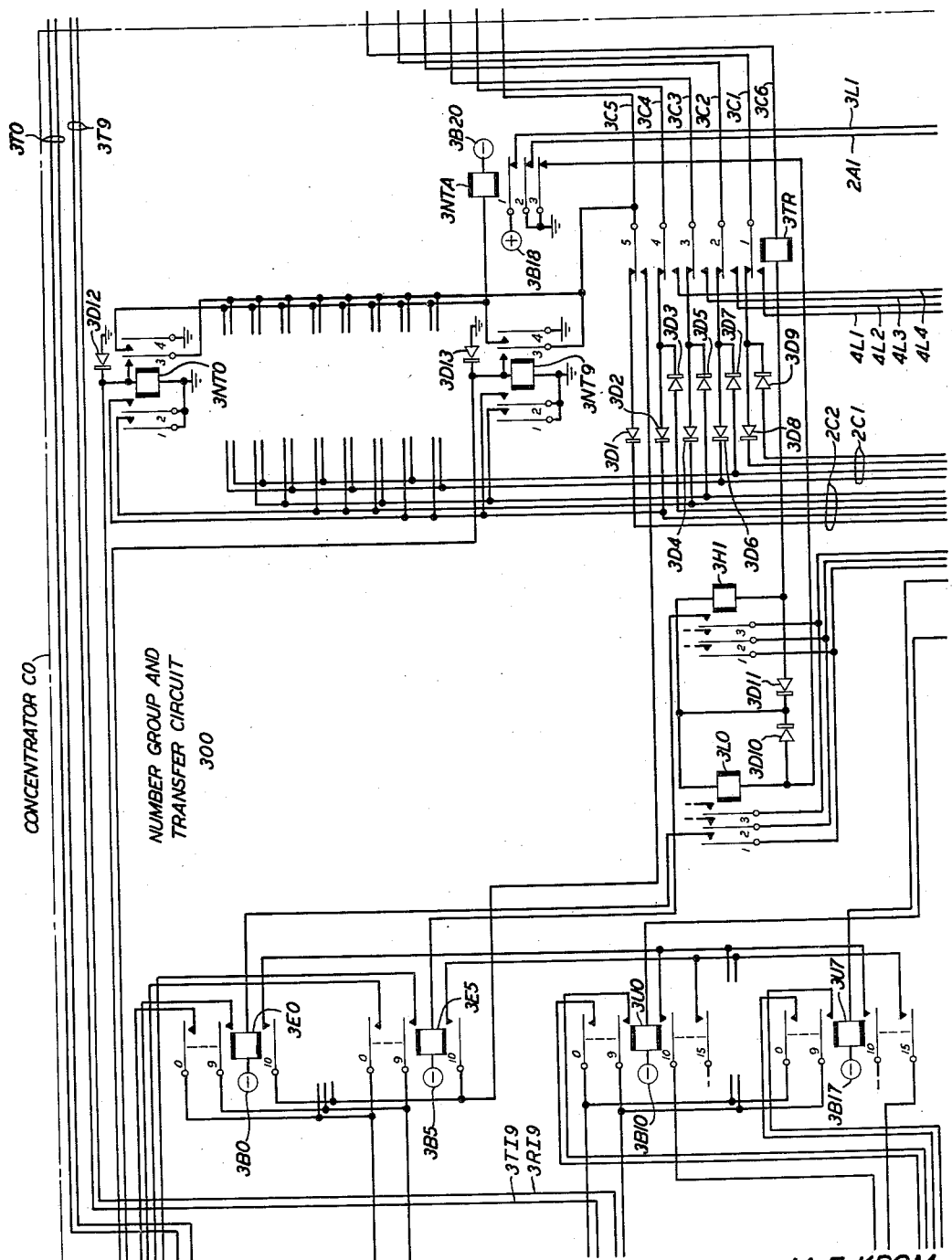
Fig. 3 illustrates the number group and transfer circuit in the concentrator of the present invention.
Figure 4:
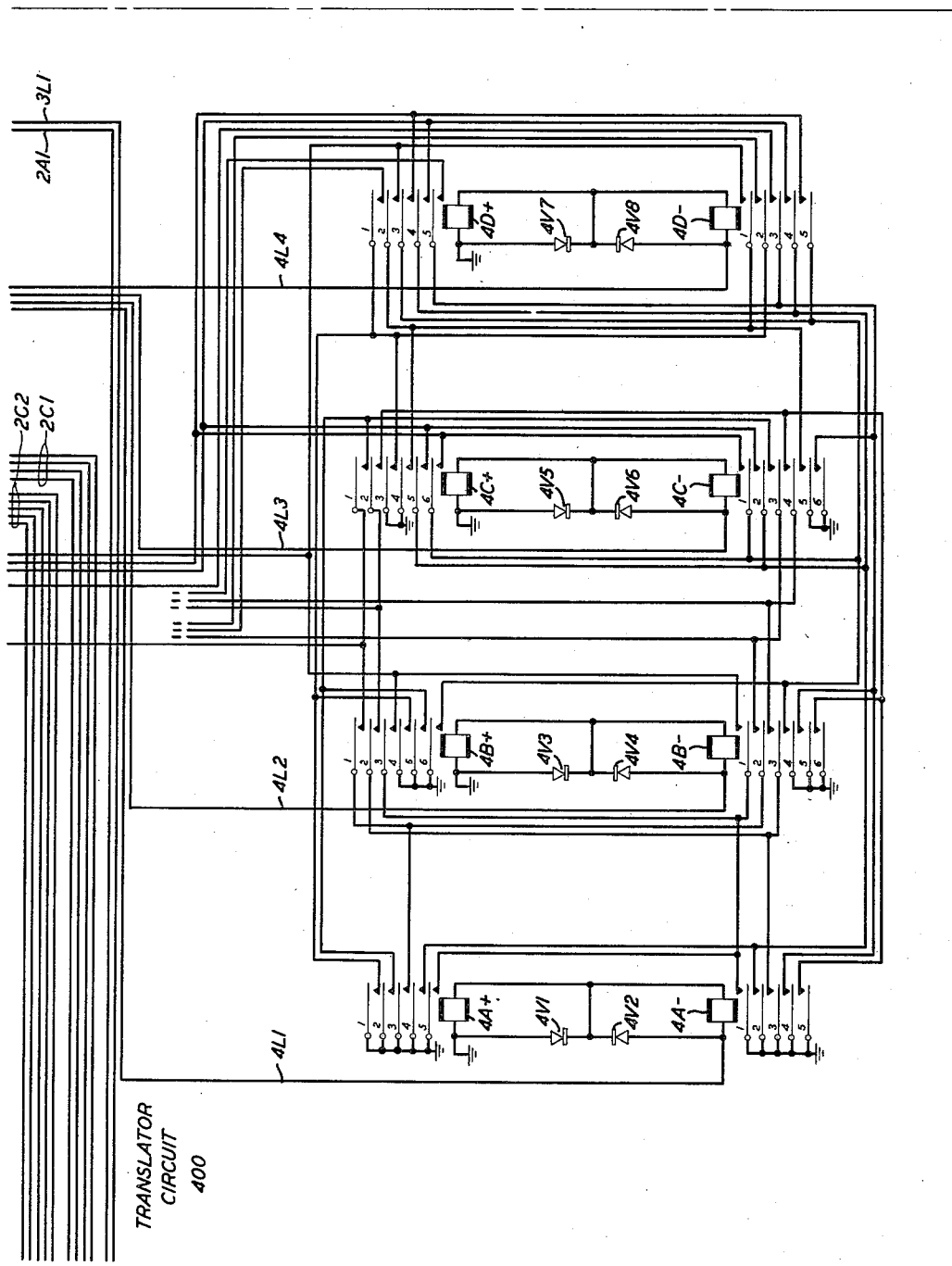
Fig. 4 illustrates the translator circuit in the concentrator of the present invention.
Figure 5:
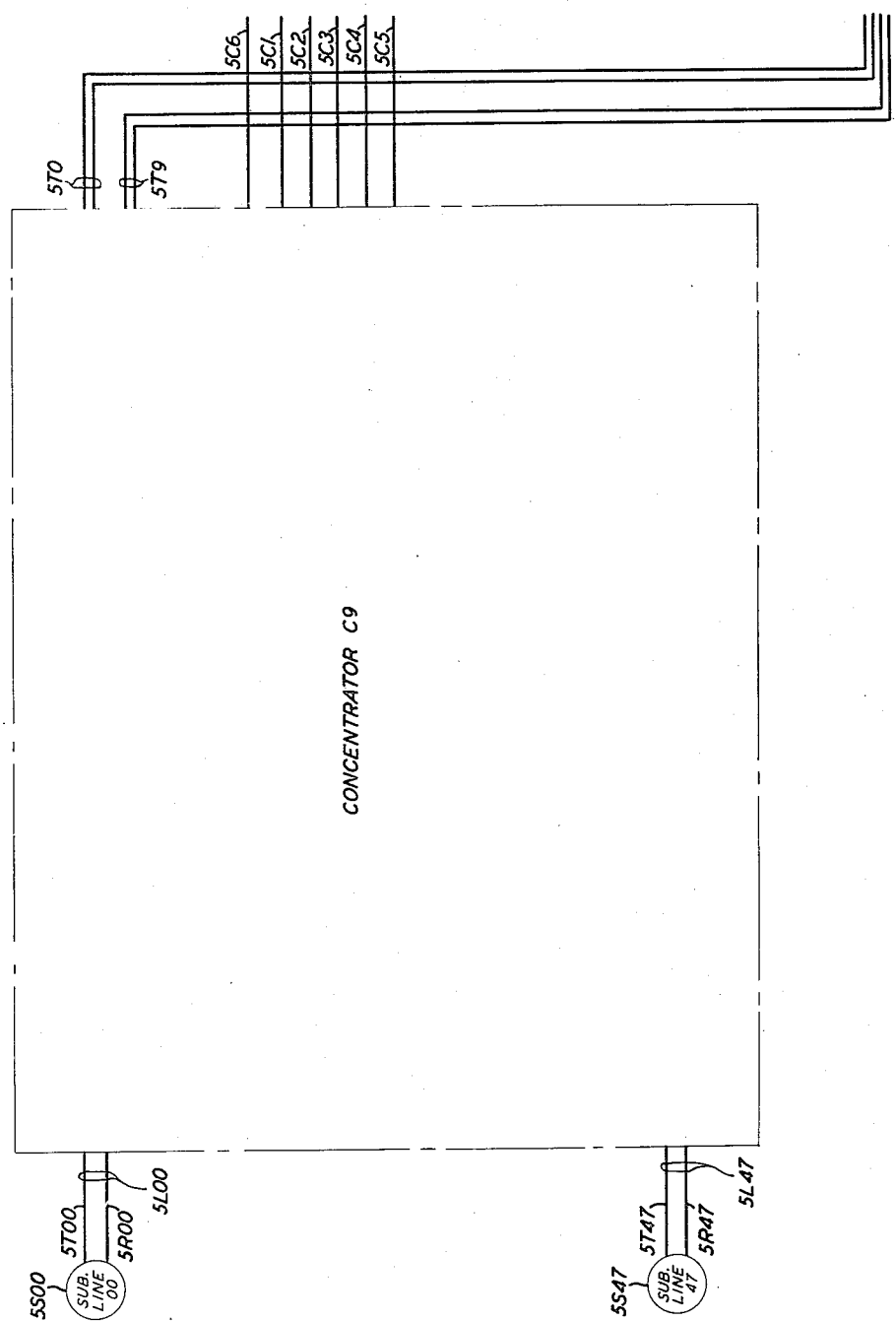
Fig. 5 illustrates diagrammatically another concentrator of the present invention.
Figure 6:
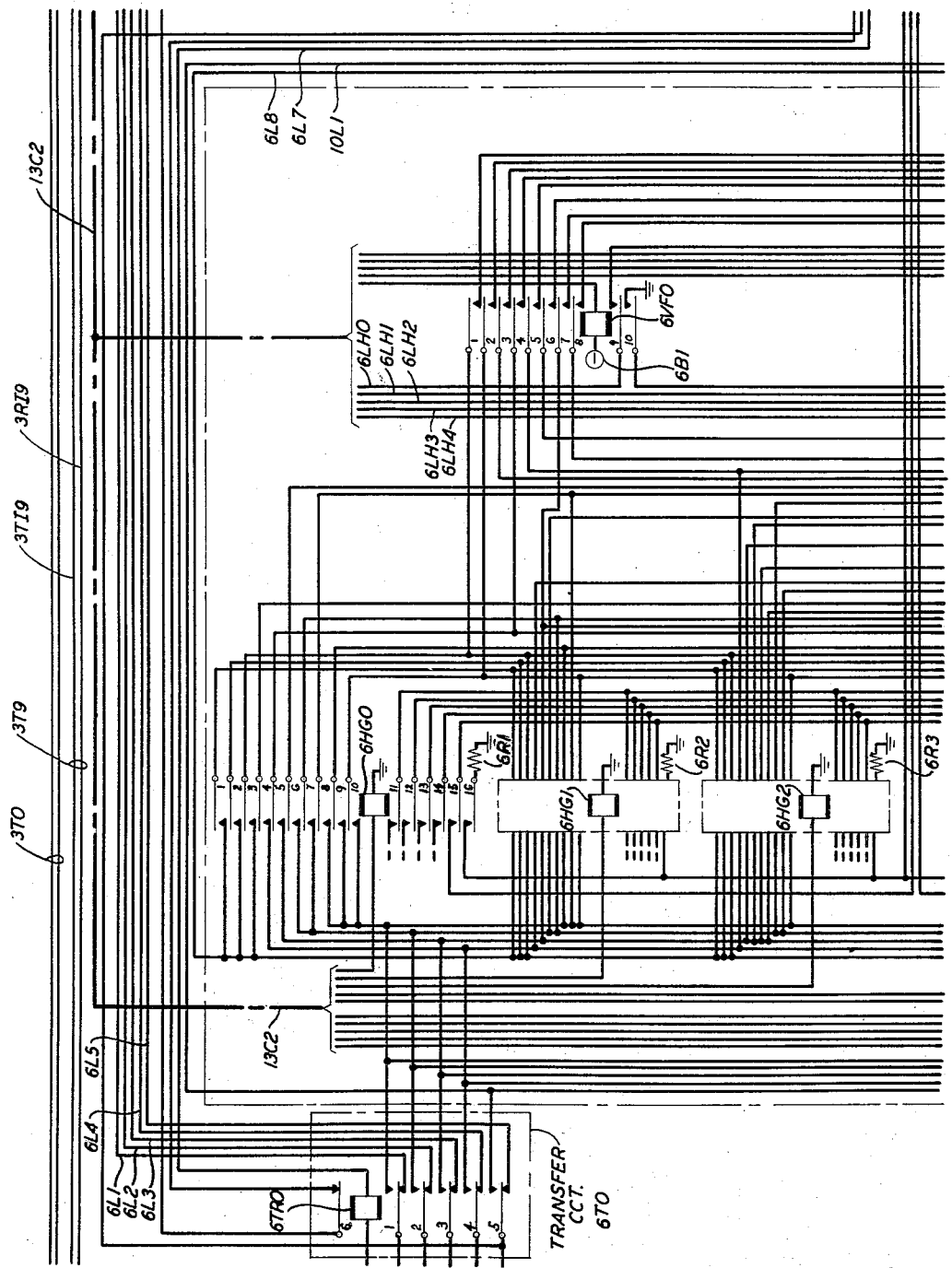
Figs. 6, 7 and 8 illustrate the transfer circuits and the common control circuit at the central office of the present invention.
Figure 7:
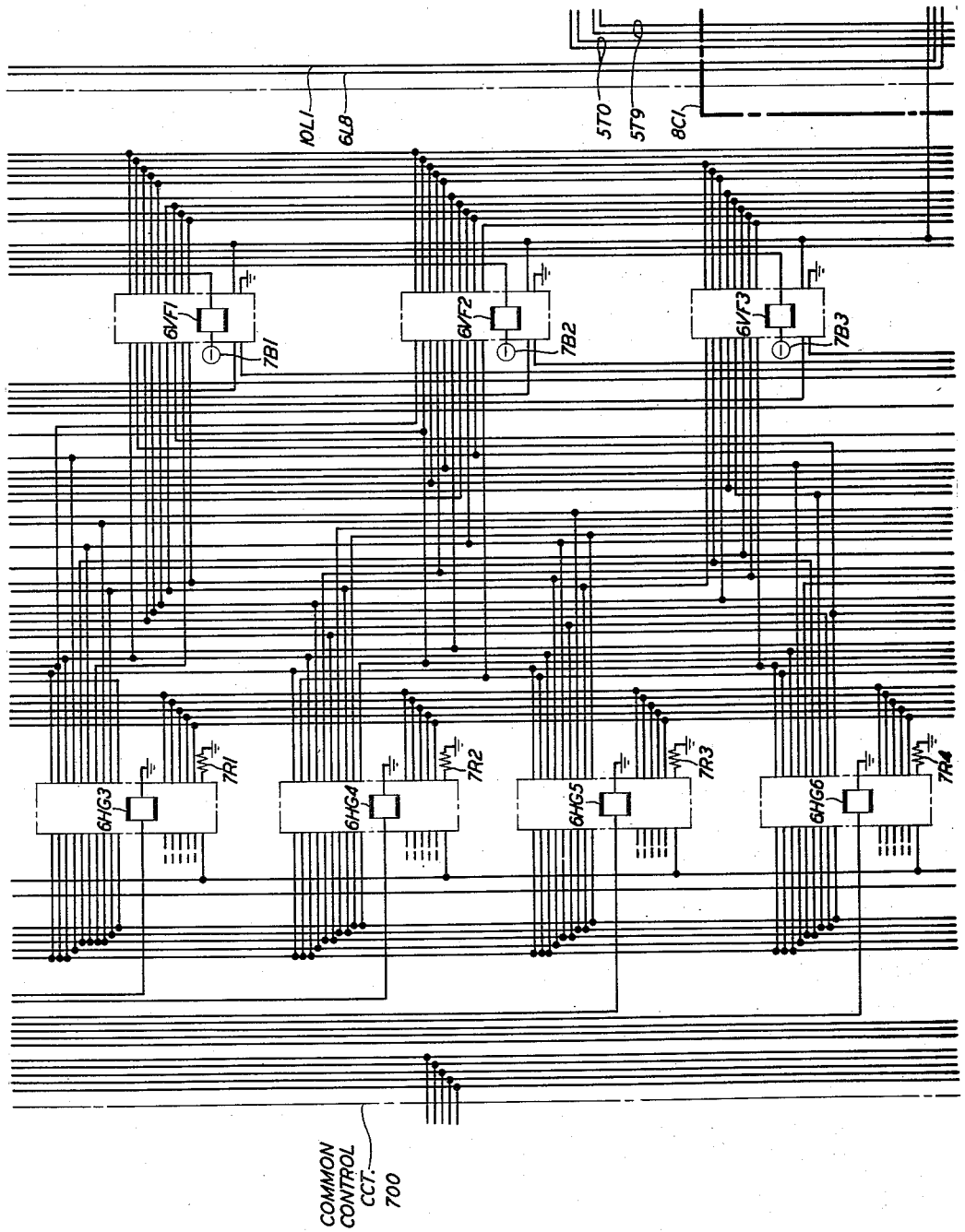
Figure 8:
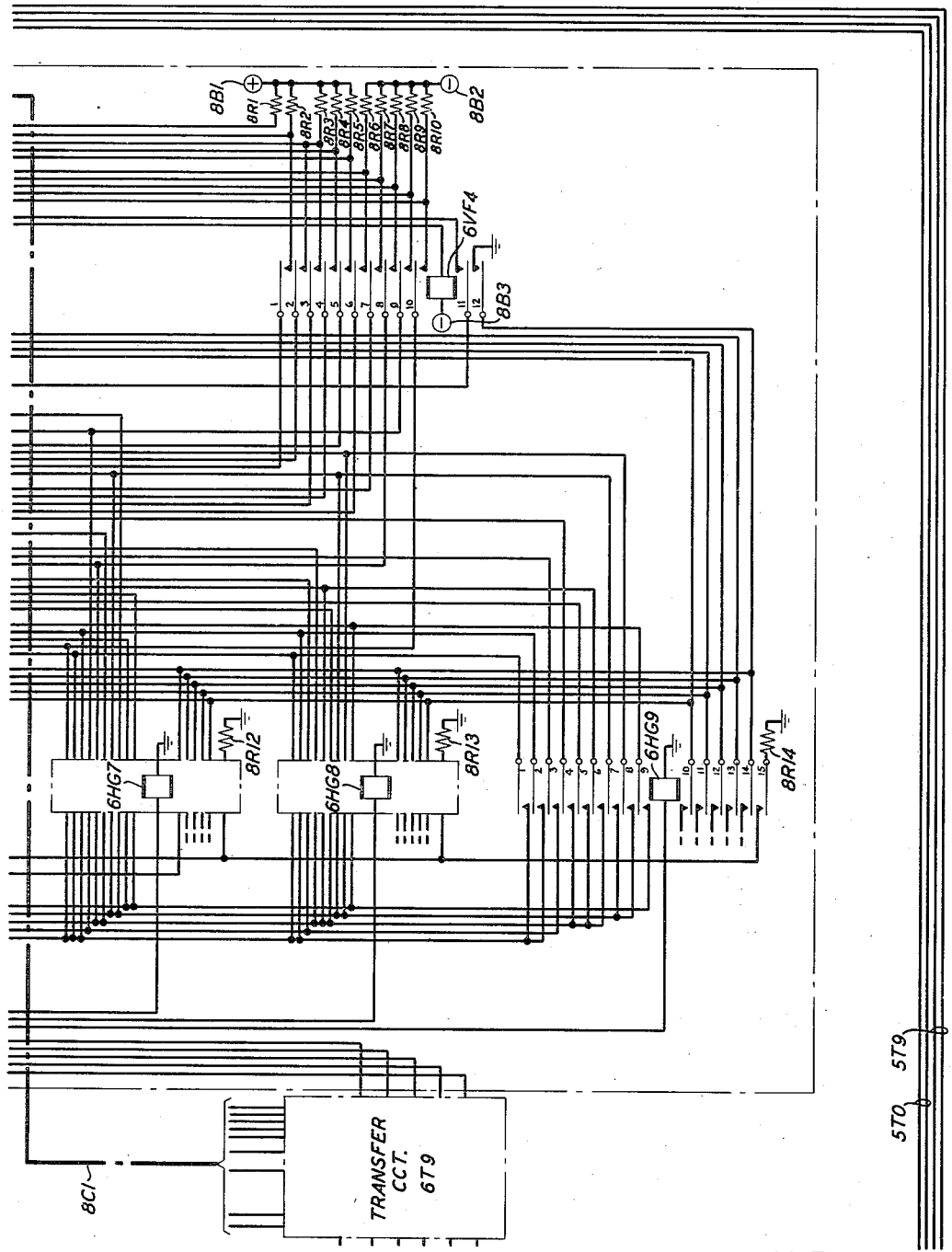
Figure 9:
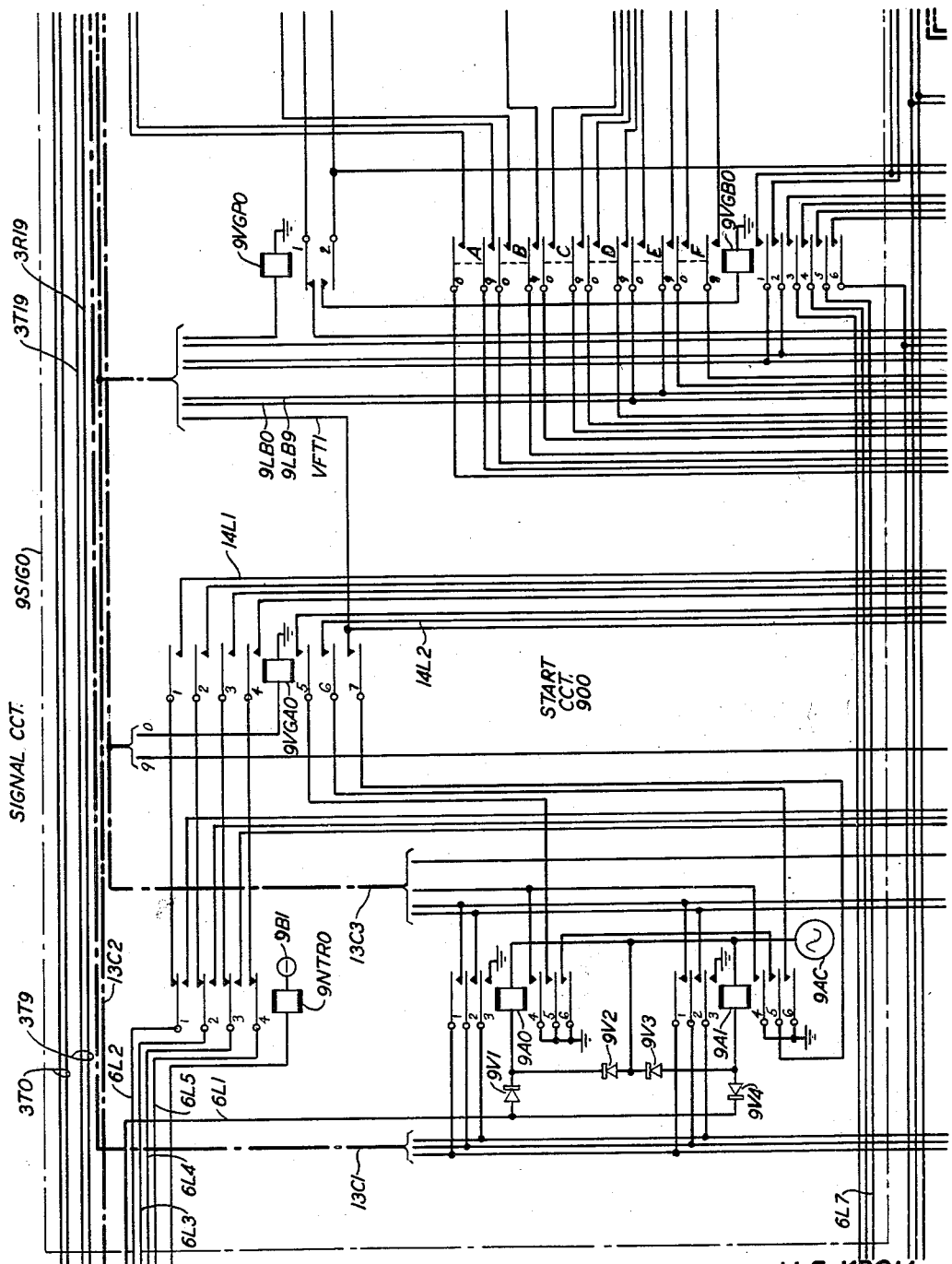
Figs. 9 and 11 illustrate a signal circuit at the central office of the present invention.
Figure 10:
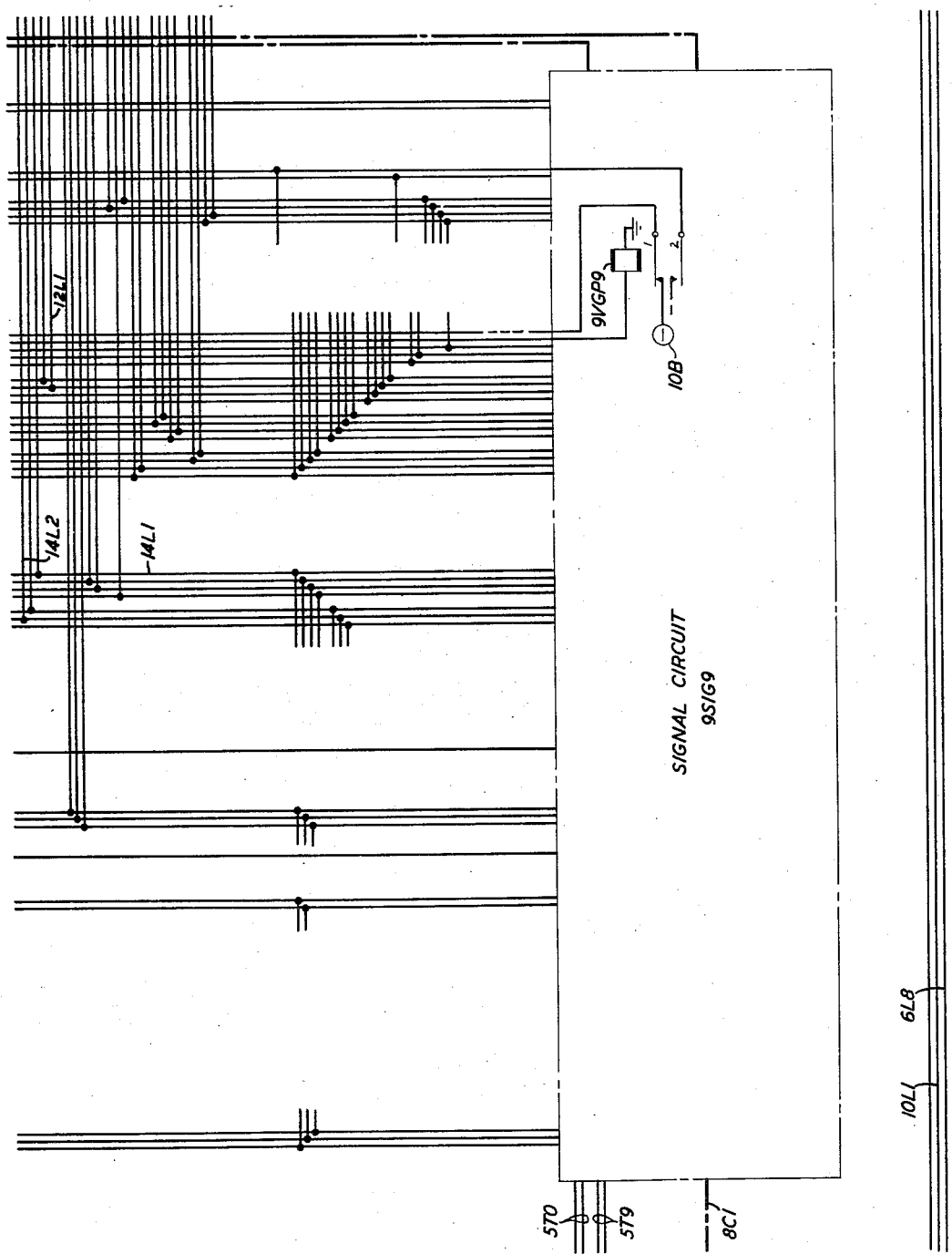
Fig. 10 illustrates diagrammatically another signal circuit at the central office of the present invention.
Figure 11:
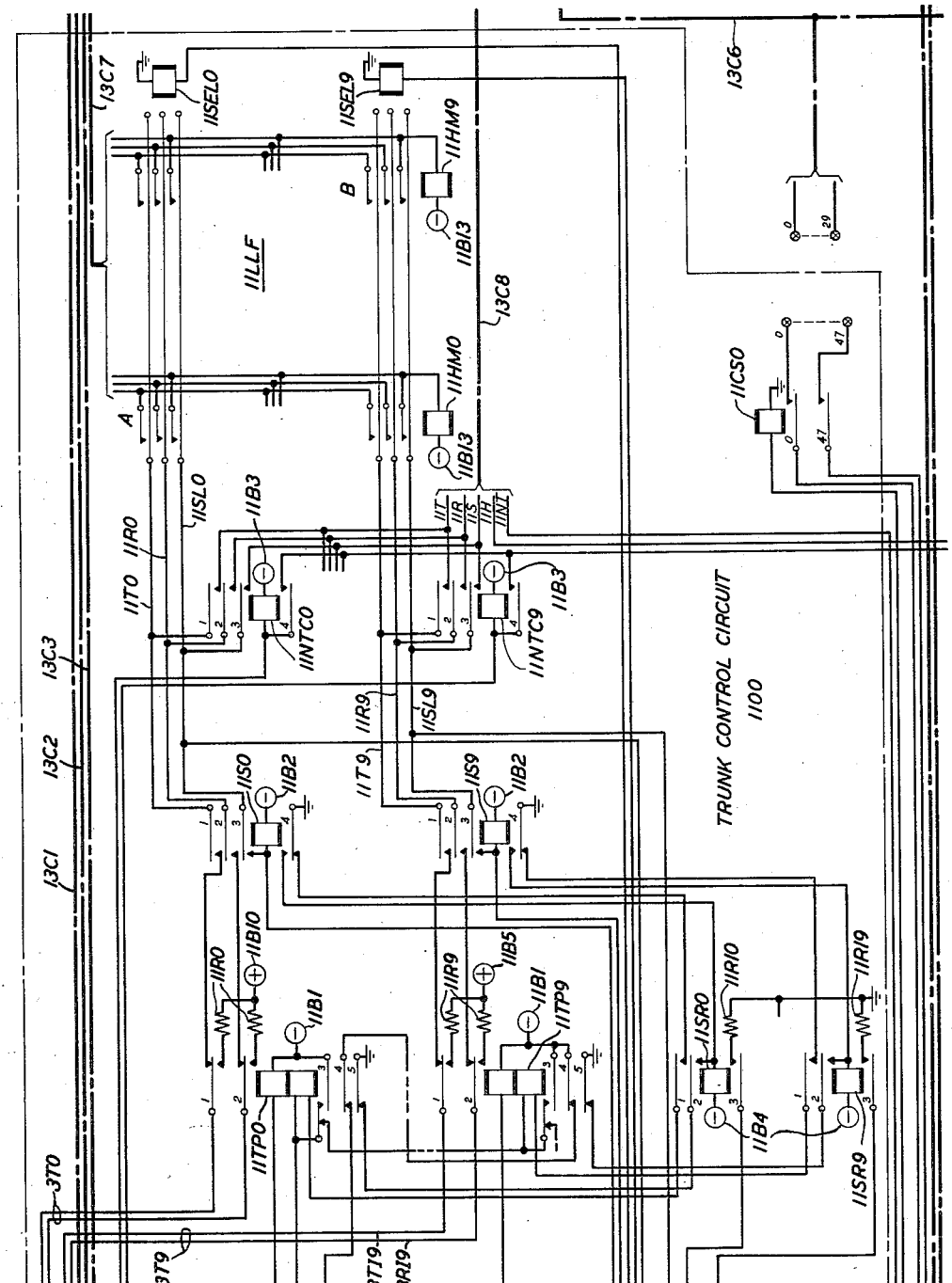
Figure 12:
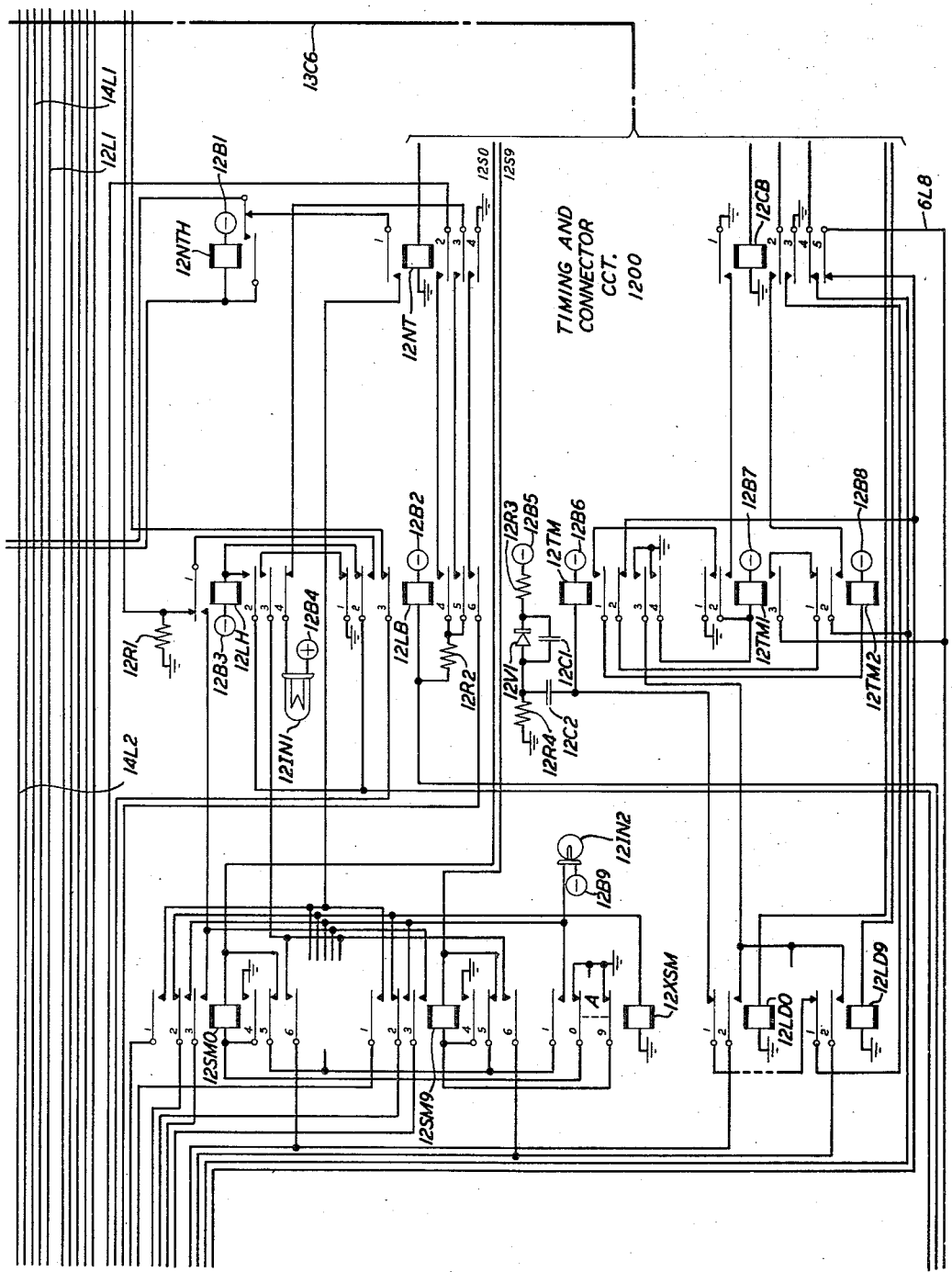
Fig. 12 illustrates a timing and connector circuit at the central office of the present invention.
Figure 13:
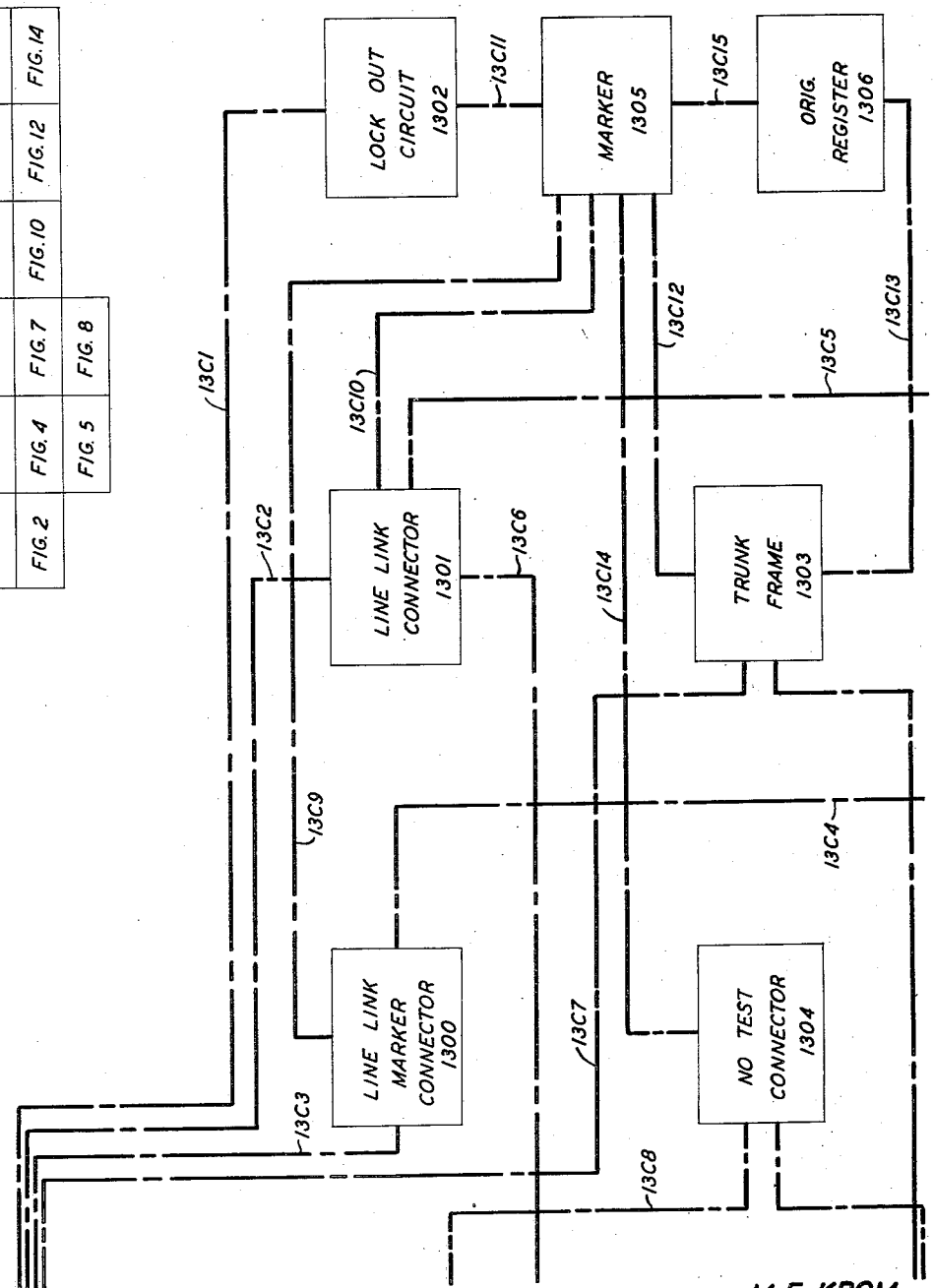
Fig. 13 illustrates diagrammatically some of the components in a No. 5 crossbar telephone system.
Figure 14:
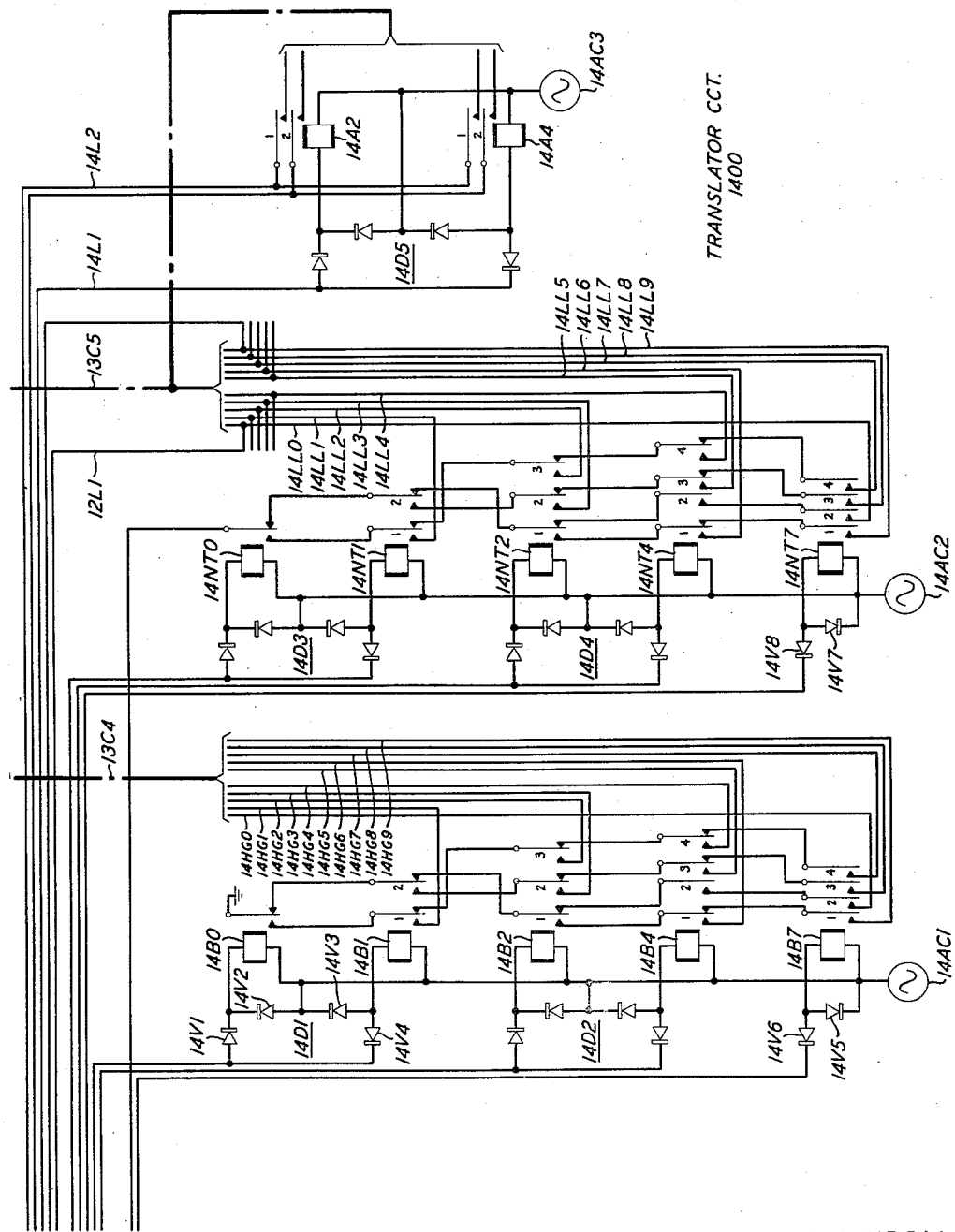
Fig. 14 illustrates a translator circuit at the central office of the present invention.

In the functional circuits of Figs. 16 and 17 and in the detailed circuits of Figs. 1 through 14, when arranged in accordance with Fig. 15, the equipment has generally been given letter designations representative of functional characteristics preceded by a number which indicates the figure in the detailed circuits in which the equipment is located. The subscriber's station having an identifying number of 00, for example, is designated 1S00 and is shown in Fig. 1 in the detailed circuits and in Fig. 16 in the functional circuit.

GENERAL DESCRIPTION

Referring to Figs. 17 and 16, with Fig. 16 arranged to the left of Fig. 17, ten concentrators C0-9 are connected to the concentrator control 290 which is located at the central office. All the equipment and circuits shown on Fig. 17 are located at the central office and the equipment and circuits shown on Fig. 16 are remotely located. Each one of the concentrators C0-9 provides for a connection between any one of 48 subscriber stations and any one of ten trunks connecting the concentrator with the central office. The concentrator C0, for example, provides for connections between the substations 1S00-47, which are connected thereto respectively by the lines 1L00-47, and the ten trunks 3T0-9. Each of the ten concentrators is also connected to the central office concentrator control 290 by six control leads; the concentrator C0, for example, by the leads 3C1-6 and the concentrator C9 by the leads 5C1-6.

The concentrators C0-9 and the control 290 are connected into a crossbar telephone system of the type described in the above-identified patent to Busch. The connectors 1304, 1300, 1301, the register 1306, the lockout circuit 1302, the marker 1305 and the trunk frame 1303 are standard components in such crossbar systems. The trunk frame connector and originating register connector are not shown.

In such crossbar telephone systems two basic types of switching frames are utilized; trunk frames such as trunk frame 1303 and line link frames, not shown in the functional circuits of Figs. 17 and 16. The frame 11LLF which is part of the trunk control circuits 1100 in the signal circuits 9SIG0-9 is equivalent to the secondary of the ordinary crossbar line link frame. Ordinarily subscriber lines are associated with the line link frames and all types of outgoing and incoming trunks and originating registers are associated with the trunk frames. The general effect of the concentrators C0-9 and the control 290 is to remove the function of the primary line link frame to a remote point so as to reduce the conductor mileage connecting the subscribers to the central office. The concentrators C0-9 are in this manner inserted between the frames 11LLF in the circuits 1100 and the subscriber stations 1S00-47, 5S00-47, etc. Each vertical group of the ordinary primary line link switch or frame becomes one of the concentrators C0-9 in the concentrating system of the present invention.

When a call is originated by one of the subscribers, for example, 1S00, connected to the concentrator C0, the line circuit 200 is operated to indicate the demand for service. The operation of the line circuit 200 initiates the operation of a line lockout and identifier circuit 201 which locks out the other 47 lines 1L01-47 and which identifies the calling line 1L00.

The line lockout and identifier circuit 201 identifies the units and tens digits of the calling line 1L00 and supplies the information to a number group and transfer circuit 300 which translates the decimal indication provided by the circuit 201 to a two-out-of-four code for the tens digit and to a two-out-of-five code for the units digit. The circuit 300 also readies a path for transmitting the coded identification of the calling line 1L00 over the three control pairs, or six control leads, 3C1-6, to the central office control 290. Five leads 3C1-5 are utilized to signal the units and the tens digits of the calling line to the central office control 290. Each one of the leads 3C1-5, as is hereinafter described, carries either the positive half cycles or the negative half cycles, or both, of an alternating-current potential in accordance with a code shown in Fig. 18. The sixth signal lead 3C6 is a transfer signal lead which is energized at the central office, after the marker 1305 has been seized, to transfer the other five signaling leads 3C1–5 for a terminating operation which results in the connection of the calling line 1L00 to a selected one of ten trunks 3T0–9.

The readied code signal paths, from the circuit 300 in the line concentrator C0, pass through the transfer circuit 6T0 in the central office concentrator control 290 to a start circuit 900 which is part of the signal circuit 9SIG0 mentioned above. The path through control lead 3C1 is completed in the start circuit 900 but the paths readied by the circuit 300 in the concentrator C0 through the control leads 3C2–5 and the transfer circuit 6T0 are not complete in the start circuit 900. As is hereinafter described, when the marker 1305 is seized, the start circuit 900 is operated to complete the four paths from the concentrator C0 to the translator 1400 in the central office concentrator control 290.

When the path from circuit 300 through lead 3C1 is completed at the circuit 300, the start circuit 900 calls in the lockout circuit 1302. Lockout circuit 1302 is operated through cable 13C1 to prevent a false service request or start when the line to register connection, hereinafter described, is released during the call-back sequence of operations. If another call is waiting to be served the lockout circuit 1302 does not operate. The start circuit 900 also provides a start signal, which is also a line link frame identification, through cable 13C3 to the line link marker connector 1300. The connector 1300, in turn functions through cable 13C9 to call in a marker 1305 and to supply the frame identification thereto. Only one call may be served at a time because the signal circuits 9SIG0–9 are multipled to a single start lead to the connector 1300. The start circuit 900 also functions to provide an indication of the vertical group number of the concentrator C0 through cable 13C3, the line link marker connector 1300, and cable 13C9 to the marker 1305.

When the line link marker connector 1300 seizes the marker 1305 and passes thereto the signal from circuit 900 indicating the frame and concentrator identity or location, it also provides an operating potential back to the start circuit 900. The start circuit 900 thereupon completes the signal paths over leads 3C2–5 from circuit 300 through transfer circuit 6T0 and start circuit 900 to the translator 1400.

A portion of start circuit 900 is connected through transfer circuit 6T0 to lead 3C6 and functions together with the translator 1400 to register the alternating-current simplex signals transmitted through the leads 3C1–5. The two-out-of-four coded signals for the tens digit and the two-out-of-five coded signals for the units digit are registered and translated into decimal code. The units digit is supplied from translator 1400 through cable 13C4 to the line link marker connector 1300 which supplies it through cable 13C9 to the marker 1305. The tens digit is supplied to the marker 1305 partially from translator 1400 through cable 13C5, the connector 1301 and cable 13C10, and partially from circuit 900 through cable 13C3, the connector 1300 and cable 13C9.

When the marker 1305 was seized by the connector 1300, it in turn seized the line link connector 1301 through cable 13C10. The units and tens digits of the calling line are in this manner supplied by the concentrator control 290 through the connectors 1300 and 1301, respectively, to the marker 1305 as horizontal group and vertical file indications. The marker 1305, having this information, seizes the concentrator control 290 through the line link connector 1301 and supplies the vertical file and horizontal group information thereto. The horizontal group and vertical file information is supplied to and recorded by the common control circuit 700 in the control 290. The circuit 700 operates the transfer circuit 6T0 and the circuit 300 in the concentrator C0 to transfer the five signaling leads 3C1–5, for signaling from the central office to the concentrator C0, and supplies positive potential over the sixth lead 3C6 for line numbers 0 to 23 and a negative potential for line numbers 24 to 47. The control circuit 700 also translates the recorded identity of the tens and units digits, or the horizontal group and vertical file indication, to a two-out-of-eight positive and negative direct-current pulse code which has a maximum of 24 possible combinations. The two-out-of-eight coded signal is sent through the transfer circuit 6T0 at the central office and the four signaling leads 3C1–4 to the number group and transfer circuit 300 at the concentrator C0. The positive or the negative signal through the sixth signaling lead 3C6 determines whether the 24 combinations are from 0 to 23 or 24 to 47.

The circuit 300 in the concentrator C0 supplies the coded signals to a number group translator 400 which converts the two-out-of-eight coded direct-current signals to a six and an eight-unit code indication. The six and eight-unit code indication is supplied by the circuit 400 back to the number group and transfer circuit 300. The six and eight-unit code indication is registered in circuit 300 and supplied to each of the ten trunk circuits 1T0–9 to control the establishment of a connection between a selected one of the trunks 3T0–9 and the calling line 1L00.

When the marker 1305 is connected to the concentrator control 290 through the connector 1301, it also obtains access thereto for selecting an idle one of the trunks or links 3T0–9 in setting up the call. Since the marker 1305 supplies operating potentials for selecting the trunks 3T0–9 it has the information as to which of them is busy. Having selected an idle link or trunk 3T0–9, the marker 1305 operates the timing and connector circuit 1200 through the cable 13C10, the line link connector 1301, and cable 13C6. The connector circuit 1200 supplies the identity of the selected trunk, 3T0 for example, to the trunk control circuit 1100, which connects a high positive voltage over both sides of the selected trunk 3T0 toward the concentrator C0 as a seizure potential and which readies a path from the trunk frame 1303 through cable 13C7 to the trunk 3T0. The seizure potential is provided through the trunk 3T0 to the trunk circuit 1T0. Each trunk 3T0–9 is connectable by means of its associated trunk circuit 1T0–9 to each of the 48 calling lines 1L00–47 associated with the concentrator C0. The operation of the trunk circuit 1T0 associated with the selected trunk 3T0 is controlled, as described above, by the number group and transfer circuit 300 when the seizure potential is received. The potential provided through the trunk 3T0 to the trunk circuit 1T0 in this manner effectively closes a crosspoint common to, or provides a connection between, the calling line 1L00 and the trunk 3T0.

When the trunk circuit 1T0 is operated it also operates the line circuit 200 to provide a line busy indication through the number group and transfer circuit 300, lead 3C5, transfer circuit 6T0, lead 10L1 to the timing and connector circuit 1200 as an indication that the line crosspoints are closed. Operation of the circuit 1200 controls the trunk control circuit 1100 which removes the high voltage potential through the trunk 3T0 and provides an indication to the marker 1305 that the line crosspoints are closed. When the marker 1305 receives this indication it connects the originating register 1306 through cable 13C13, trunk frame 1303 and cable 13C7 to the trunk control circuit 1100 to supply dial tone over trunk 3T0 through concentrator C0 to the calling line 1L00. When the register 1306 is connected to the calling line 1L00 the marker 1305 disconnects.

In the crossbar telephone system described in the above-identified patent to Busch, the marker holder time for servicing the call to provide dial tone is approximately 300 milliseconds. Due to the utilization of relatively rapid direct-current coded signals from the central office to the concentrator C0 only approximately 10 milliseconds are added to the marker holding time. If use were made, during the marker holding time, of alternating-current simplex signals similar to those utilized for transmitting the identity of the calling line 1L00 from the concentrator to the central office before the marker 1305 was seized, the marker holding time would be increased approximately 40 milliseconds. The utilization of alternating-current simplex signaling from the concentrator C0 to the central office is to avoid a multiplicity of potential sources at the concentrator C0 or to avoid power dissipation in supplying the voltage to the concentrator C0; whereas, the utilization of direct-current signaling from the central office to the concentrator C0 is to maintain the marker holding time as low as possible.

When the originating subscriber at substation 1S00 receives dial tone and dials, the dialed digits are registered in the originating register 1306. At the completion of dialing the register 1306 summons a marker 1305 through cable 13C15 and passes to it all the information necessary to complete the call including a record of the line-to-register linkages and the identity of the calling and called subscriber lines. The marker 1305 releases the register 1306 and proceeds, after having ascertained that a linkage is available, to establish the line-to-trunk connection, which operation is referred to as callback.

A call-back call in conjunction with a concentrated line such as 1L00 is somewhat more complex than one in conjunction with an ordinary line which is not connected to a concentrator because the line-to-trunk connection at the concentrator C0 is locked operated and must receive a distinct release signal in order to disconnect. For the ordinary non-concentrated line the marker 1305 has direct control through the line link and trunk link frames of the linkages but such control is absent from the line-to-trunk connection through the concentrator C0. This connection must be released on each call-back call since the link which is selected by the marker 1305 for the line-to-trunk connection on callback is not necessarily the same as that used for the line-to-register connection described above. Provision has therefore been made for applying a release signal on the selected trunk, which was utilized for the line-to-register connection, preceding the establishment of the callback or line-to-trunk linkage. In the concentrator system of the present invention the marker 1305 makes use of the recorded line linkages to release the line-to-register connection at the concentrator C0 before establishing the line-to-trunk connection.

When the marker 1305 is ready to establish the line-to-trunk linkage it selects the line link frame in which the concentrator C0 appears, doing so in the regular manner as described above in the above-identified patent to Busch; it supplies decimal coded signals representing the identity of the calling line through line link connector 1301 to the common control circuit 700; and it provides an indication that the operation is for a callback through cable 13C10, the line link connector 1301 and cable 13C6 to the timing and connector circuit 1200. The circuit 1200 operates to delay the operation of the transfer circuit 6T0 in order to prevent the transmission of the identity of the calling subscriber from the control circuit 700 through the transfer circuit 6T0 to the translator circuit 400 in the concentrator C0.

The disconnect signal hereinafter described is identical to the seizure or connect signal which is supplied over the tip and ring of the selected trunk 3T0–9. For a connect operation the control circuit 700 supplies the two-out-of-eight coded signals through the transfer circuit 6T0 to the concentrator concurrently with the transmission of the seizure potential over the selected trunk 3T0–9. When the two-out-of-eight coded signals are not transmitted and the seizure potential alone is transmitted, it functions as a disconnect instead of a connect potential.

The timing and concentrator circuit 1200 controls the transmission of the disconnect potential from the trunk control circuit 1100 and times the duration of the disconnect potential to allow for releasing the trunk circuit 1T0 in the concentrator C0. When the trunk circuit 1T0 receives the disconnect potential through the trunk 3T0 it opens the connection between the line 1L00 and the trunk 3T0. Line 1L00 does not initiate another service request during this disconnect interval due to the operation of the lockout circuit 1302, as described above. At the end of the timing interval the timing and disconnect circuit 1200 causes the trunk control circuit 1100 to remove the disconnect potential from the trunk 3T0 and thereafter operates the transfer circuit 6T0 and the number group and transfer circuit 300 in the concentrator C0 to permit the connection by the marker 1305 of the subscriber's line 1L00 to a newly selected one of the trunks 3T0–9. From this point on the sequence of operation for callback is quite similar to the sequence of operation described above for supplying dial tone to the calling line. If trunk 3T9 is selected by the marker 1305 for the establishment of the connection, the timing and connector circuit 1200 causes the trunk control circuit 1100 to supply a connect potential over the trunk 3T9, and the common control circuit 700 concurrently supplies the two-out-of-eight coded signals through the transfer circuit 6T0, the control leads 3C1–5 and the number group and transfer circuit 300 to the translator circuit 400. The translator circuit 400 functions to translate the two-out-of-eight direct-current code to a one-out-of-six and a one-out-of-eight coded indication and supplies it back to the number group and transfer circuit 300. The operation of the number group and transfer circuit 300 supplies this information to the trunk circuits 1T0–9 which, together with the connect potential on trunk 3T9, provides for a connection from the calling line 1L00 through the trunk circuit 1T9 to the trunk 3T9.

Mutual lockout occurs between the start circuit 900 and the trunk control 1100 so that both service request and disconnect cannot be served at any one time. Whichever occurs first delays servicing the other. Lockout also must exist between originating and terminating calls that occur simultaneously since the same concentrator control 290 is utilized in the central office for both types of calls. If the connect potential for an originating call has not as yet been applied, the trunk control circuit 1100, in conjunction with the start circuit 900, provides a preference for the terminating call over the originating call. In general, as described above, all calls are treated as terminating calls when establishing the connections at the concentrators C0–9. Transmission of information from the concentrators C0–9 is generally limited to passing the calling line number to the central office and thereafter the call is treated as a terminating call.

A terminating call to a concentrator line such as 1L00–47 or 5L00–47 is completed by a marker 1305 in a manner very similar to that employed for a regular line appearance on a line link frame. Having obtained access to the frame through the line link connector 1301, the marker 1305 operates the control circuit 700 through the line link connector 1301 and the timing and connector circuit 1200 through the line link connector 1301. The common control circuit 700 registers the identity of the terminating line and operates the transfer circuit 6T0 so that the identity of the terminating line may be transmitted to the concentrator C0. When the timing and connector circuit 1200 operates, it causes the trunk control circuit 1100 to supply the connect potential at the same time that the two-out-of-eight direct-current coded signals are supplied from the common control circuit 700 through the transfer circuit 6T0 to the concentrator C0. If the terminating line is busy the line circuit 200 supplies this indication back through the control lead 3C5, the transfer circuit 6T0, lead 10L1, the timing and connector circuit 1200, cable 13C6 and the line link connector 1301 and cable 13C10 to the marker 1305. This indication to the marker 1305, that the line is busy, causes the marker 1305 to dismiss the line link frame and the concentrator C0 and to proceed to return line busy tone to the distant calling subscriber.

If the terminating line is idle, a line busy indication is not provided to the marker 1305 and the marker 1305 operates the trunk control circuit 1100 through the cable 13C12, trunk frame 1303 and cable 13C7. The trunk control circuit 1100 thereafter functions to supply a connect potential to the concentrator C0 to close or operate the corresponding trunk circuit 1T0–9 associated with the selected trunk 3T0–9 in a manner similar to that described above for an originating call.

For a no-test call the sequence of operations is somewhat different because if the line is busy the concentrator system of the present invention must provide the identity of the trunk 3T0–9 which is utilized for the line being tested. The no-test call commences as a terminating call except that an indication that the call is a no-test call is provided by the marker 1305 to the connector 1200. The direct-current coded signals are supplied to the concentrator C0. If the line, 1L00 for example, is busy, a busy indication is provided to the connector 1200 which supplies a no-test potential over through the transfer circuit 6T0 and lead 3C5 to the number group and transfer circuit 300.

Responsive to the no-test potential, the circuit 300 provides alternating-current simplex coded signals arranged on a two-out-of-four basis and representing the identity of the trunk connected to line 1L00. The identity of the connected trunk is supplied over the control leads 3C2–4 through the transfer circuit 6T0 and the start circuit 900 to the translator 1400. The coded signals are translated by the translator 1400 to a decimal indication of the trunk and are sent as translated through cable 13C5, the connector 1301 and cable 13C10 to the marker 13C05.

When the marker 1305 receives the identity of the utilized trunk, it functions through cable 13C14 to connect the no-test connector 1304 through cable 13C8 and the trunk control circuit 1100 to the utilized one of the trunks 3T0–9 to bridge the established line-to-trunk connection. After establishing this bridging connection, the marker 1305 releases, leaving the bridging connection locked to the connector 1304. The line-to-trunk connection is still controlled by the calling and called subscribers, either of whom may initiate disconnect by hanging up.

DETAIL CIRCUIT DESCRIPTION

*Originating call*

Essentially the function performed by the concentrating system shown in Figs. 1 through 14, when arranged in accordance with Fig. 15, is to remove the function of the primary line switch frame of the No. 5 crossbar system from the central office to a remote point so as to reduce the conductor mileage connecting the subscribers to the central office. Each vertical group of the primary line switch becomes one of ten concentrators C0–9 in the concentrator system wherein each of the concentrators C0–9 is connected by ten trunks and three control pairs to the central office and has connected thereto a maximum of 48 subscribers' lines. The detail circuit representation of concentrator C0 is shown in Figs. 1 through 4 with 48 substations 1S00–47 connected respectively through subscribers' lines 1L00–47 thereto. The concentrator C0 is in turn connected by means of the ten trunks 3T0–9 and the three control pairs or six control leads 3C1–6 to the central office which is shown in Figs. 6 through 14.

Though each of the lines 1L00–47 is shown having one substation, the lines 1L00–47 may be multiparty lines. Any type of multiparty line which may be used in No. 5 cross-bar systems of the type described in the above-identified patent to Busch may be utilized as one of the lines 1L00–47. As described above, the connect signals applied to the trunks 3T0–9 are simultaneously applied to both tip and ring. Such signaling is not duplicated by any of the conventional party line ringing codes so that false connections do not result when any of these ringing codes are applied.

When a call is originated at one of the substations 1S00–47, which is connected to the concentrator C0, an individual associated line relay 2L00–47 in the line circuit 200 is operated to indicate the demand for service. For example, when the call is originated at the substation 1S00, a path is completed from ground at the right normal contact of the cut-off relay 2C00 through the tip lead 1T00 of the line 1L00, the substation 1S00, the ring lead 1R00 of the line 1L00, the left normal contact of relay 2C00 and the winding of the line relay 2L00 to the battery 2B00 causing relay 2L00 to operate. The operation of the line relay 2L00 in the line circuit 200 initiates the operation of the line lockout and identifier circuit 201 to lock out the other 47 line relays 2L01–47 and to identify the calling line 1L00.

The line lockout and identifier circuit 201 has ten units relays 2LU0–9 and five tens relays 2LT0–4 which identify the calling line on a decimal basis. When relay 2L00 in the line circuit 200 is operated, an operating path for the units relay 2LU0 is closed from the battery 3B18 in the number group and transfer circuit 300 through the normal contact 1 of the relay 3NTA, lead 3L1, the winding of relay 2LU0 through the operated left armature of relay 2L00 and the resistor 2R1 to the negative potential source 2B48. The resistor 2R1 is shunted by the series circuit comprising the diode 2U0 and the lockout impedance 2L0U. In this manner the left armature of each of the line relays 2L00–47 is connected in series with the winding of one of the line units relays 2LU0–9 corresponding to the units number of the calling line. The impedance of the resistor 2R1 is relatively large in comparison with the impedance of the winding of relay 2LU0 so that most of the voltage provided by the battery 3B18 and the battery 2B48 is across resistor 2R1. This potential difference is also across the diode 2U0 and the lockout impedance 2L0U causing the diode 2U0 to ionize. The lead connected to the anode of diode 2U0 is normally floating, and resistor 2R1 functions as a discharge path to prevent false ionization. Resistor 2R3, which is similar to resistor 2R1, connects diode 2U9 to battery 2B48. When the diode 2U0 ionizes, it substantially short-circuits the resistor 2R1 and allows the relay 2LU0 to operate. By virtue of the negative impedance characteristic exhibited by the cold cathode tube or diode 2U0 and the fact that the lockout impedance 2LOU is connected to each of the diodes 2U0–9, only one of the line units relays 2LU0 can operate.

For efficient transmission of a calling line number from the concentrator to the central office, an encoding process is necessary. The encoder in turn must be acted on by only one line at a time; otherwise false numbers may be transmitted. To provide for the identification of one line at a time a lockout circuit is required at the concentrator C0. Simultaneous closure of the paths to two or more of the diodes 2U0–9 would cause them to start conducting. The total circuit current can only increase slowly however, due to the presence of inductance of the impedance 2LOU in the common lead to battery 2B48. This would cause the diodes to pass through their negative impedance region slowly. As it is a virtual impossibility for the negative impedance characteristics of the diodes to be identical, the total impedance around the loops of the conducting units would be negative thereby causing loop currents to flow. This current would be in the direction of increasing the current flow through one of the diodes 2U0–9 and decreasing and finally extinguishing the current flow through the others. When the current through the common circuit builds up to its final value, the voltage drop across the common impedance 2LOU prevents any other unit from attaining its conducting condition.

When the relay 2LU0 operates, it prepares an operating path for the line tens relays 2LT0 from the lead 3L1 through the winding of relay 2LT0, the operated right armature of relay 2LO0, and resistor 2R2 to the battery 2B49. The impedance of the resistor 2R2 is substantially greater than the impedance of the winding of the relay 2LT0 so that the relay 2LT0 does not operate at this time. The operation of relay 2LU0 closes a shunting path through its operated armature 3, the diode 2T0 and the impedance element 2L0T to the battery 2B50. The diode 2T0 ionizes and substantially short-circuits the resistor 2R2 allowing the relay 2LT0 to operate. Due to the impedance element 2L0T, which is connected in series with the five diodes 2T0–4, only one of the line tens relays 2LT0–4 can operate at any one time. In this manner the tens and the units digits of the calling line number are established and the other 47 lines are locked out.

The operation of relays 2LU0–9 and 2LT0–4 in the line lockout and identifier circuit 201 provides a translation of the registered decimal indication of the calling line to a two-out-of-four code for the tens digit and a two-out-of-five code for the units digit in accordance with the hereinafter described table, shown in Fig. 18. The translated identification of the calling line is supplied, as is hereinafter described, through leads 2C1 and 2C2, the number group and identifier circuit 300, and the control leads 3C1–6 to the central office.

The operation of the line lockout and identifier circuit 201 grounds selected ones of the leads 2C1 and 2C2 which connect the line lockout and identifier circuit 201 to the signal number group and transfer circuit 300. There are four leads 2C1 which provide the tens indication and there are five leads 2C2 which provide the units indication. In the illustrative example described above, when the call is originated at the substation 1S00, and the units relay 2LU0 and the tens relay 2LT0 have been operated, ground is applied to the diodes 3D8, 3D6, 3D2 and 3D1 which are connected to the leads 2C1 and 2C2. The diode 3D8 is grounded through a lead 2C1 and the operated armature 2 of relay 2LT0, diode 3D6 is grounded through a lead 2C1 and the operated armature 1 of relay 2LT0, diode 3D2 is grounded through a lead 2C2 and the operated armature 1 of relay 2LU0, and diode 3D1 is grounded through a lead 2C2, the operated armature 2 of relay 2LU0, lead 2A1 and the normal armature 2 of relay 3NTA. The grounding path for diode 3D1 is through a normal armature of relay 3NTA because the control lead 3C5, to which diode 3D1 is connected, is utilized during the no-test sequence of operations. During no-test the control lead 3C5 functions as an operating and locking ground path from a positive source of potential 12B4 for the no-test relays 3NT0–9. It is necessary therefore to remove the possible connection through the positively poled diode 3D1 during no-test so that the no-test locking ground through lead 3C5 functions properly when the relay 3TR is released in preparation for sending the trunk number. The originating signaling from the concentrator C0 is delayed when a no-test call is made due to the removal of the positive battery 3B18 at the armature 1 of relay 3NTA from the lockout and identifier circuit 201. The battery 3B18, as described above, is the operating source of potential for the relays 2LU0–9 and 2LT0–4 in the circuit 201. The diodes 3D9 through 3D1 are connected through the normal contacts of the armatures 1 through 5 of the transfer relay 3TR and the control leads 3C1–5 to the central office. The diodes 3D1, 3D2, 3D4, 3D6 and 3D8 are poled in the direction of positive current from the central office and the diodes 3D3, 3D5, 3D7 and 3D9 are poled in the direction of negative current from the central office. Due to the operation of the line lockout and identifier circuit 201 as described above, the diodes 3D8, 3D6, 3D2 and 3D1 are grounded.

The control leads 3C1–5 are connected through the normal armatures 1 through 5 of the relay 6TR0 in the transfer circuit 6T0, and the leads 6L1–5 to the start circuit 900. There are ten start circuits 900, one in each of the signal circuits 9SIG0–9, which are associated respectively with the concentrators C0–9. The detail circuits of the central office concentrator control 290, which is indicated in the functional circuits shown in Figs. 16 and 17, are shown on Figs. 6 through 12 and 14. The concentrator control 290 has ten transfer circuits 6T0–9 and ten signal circuits 9SIG0–9 with the remaining circuits such as the control circuit 700, the timing and connector circuit 1200 and the translator 1400, being common to all ten concentrators C0–9. The control leads 3C1–5, which are individual to the concentrator C0, are connected through the transfer circuit 6T0, and the leads 6L1–5 to the start circuit 900. In the start circuit 900, the leads 6L2–5 are connected through the normal armatures 1 through 4 of the relay 9NTR0 to the now normal armatures 1 through 4 of the relay 9VGA0. The ground connection therefore provided by the line lockout and identifier circuit 201 does not complete at this time a path through the leads 6L2–5 and the control leads 3C2–5 since relay 9VGA0 has not as yet been operated. The lead 6L1, however, is connected respectively through the oppositely poled diodes 9V1 and 9V4 to the windings of the relays 9A0 and 9A1. The same terminals of the relays 9A0 and 9A1 are connected together through the diodes or varistors 9V2 and 9V3 which are poled in a direction of positive current from the relay 9A1 to the relay 9A0. The other terminals of the relays 9A0 and 9A1 are connected to the alternating-current potential source 9AC and to the junction of the varistors 9V2 and 9V3.

When ground is applied by the concentrator C0 to the lead 3C1 the alternating-current source 9AC operates one or the other or both of the relays 9A0 and 9A1 depending upon which one or both of the diodes 3D8 and 3D9 in the signal and transfer circuit 300 have been grounded by the line lockout and identifier circuit 201. In the illustrative example described herein the diode 3D8 was grounded to allow positive current from the central office. When positive current from the central office is utilized, relay 9A1 operates through the varistor 9V4 but relay 9A0 does not operate due to the inhibition by the varistor 9V1.

The signals provided by the concentrator C0 through the control leads 3C1–5 as described above for the lead 3C1, and as hereinafter described for the leads 3C2–5, are illustrated in the table shown in Fig. 18. For a line tens indication of zero, a positive current is provided from the central office through leads 3C1 and 3C2. At least one of the relays 9A0–1 operates for any line tens indication as shown in the chart of Fig. 18. The operation of relay 9A0 or 9A1, as is hereinafter described, operates a lockout circuit 1302, provides a start signal and indication of the identity of the line link frame and vertical group to the line link marker connector 1300 and also functions as part of a translator circuit 1400. When relay 9A1 operates, it provides ground through its operated armature 3 and cable 13C1 to the lockout circuit 1302 which prevents a false service request when the line-to-register connection is released during callback.

The operation of relay 9A1 also provides a start signal through its operated armatures 1 and 2 from the lockout circuit 1302 through the cable 13C1 and the cable 13C3 to the line link marker connector 1300. The link link marker connector 1300, which is disclosed in the above-identified patent to Busch, functions to call in a marker 1305 through the cable 13C9 to serve the call originated at the substation 1S00. There is one common start path for all ten start circuits 900, or all ten concentrators C0–9, so that originating calls therefrom are not served when the originating call from the substation 1S00 connected to the concentrator C0 is being served. Since the line lockout and identifier 201, as described above, locked out the other 47 subscriber lines 1L01–47 which are connected to concentrator C0 and there is only one start path, only the call originated on line 1L00 is served. Once the marker 1305 is seized, it ignores, until the call is served, other service requests. When relay 9A1 operates, it also provides a vertical group test lead indication by providing ground through its operated armature 4 and the cable 13C3 to the line link marker connector 1300 to indicate the vertical group number or the concentrator identity since each one of the concentrators C0–9 replaces a vertical group. The operation of the armatures 1 and 2 of relay 9A1 provides to the marker 1305 a start signal and also an indication through the line link marker connector 1300 of the identity of the line link frame in which the concentrator C0 appears. Two pieces of information are therefore supplied to the marker 1305 upon the operation of one of the relays 9A0 or 9A1 in the start circuit 900; one is the line link frame identity and the other is the vertical group identity which is the concentrator identity. Having this information, the marker 1305, over a path through cable 13C9, the line link marker connector 1300 and cable 13C3, operates the vertical group relay 9VGA0 which corresponds to the concentrator C0 in the line link frame in which the concentrator C0 appears. Only one line link frame is shown in Figs. 1 through 14 and each line link frame would include ten concentrators C0–9.

When the marker 1305 is seized, it causes the line link marker connector 1300 to operate the vertical group relay 9VGA0 which connects the translator circuit 1400 to the control leads 3C2–5. As described above, the control leads 3C2–5 were connected through the leads 6L2–5 and the normal armatures 1 through 4 of relay 9NTR0 to the armatures 1 through 4 of the relay 9VGA0. When the relay 9VGA0 operates, it extends the connection from the concentrator C0 through leads 3C2–5 to the translator circuit 1400. The translator circuit 1400 comprises a series of relay groups which are somewhat similar to the relay group consisting of relays 9A0–1 in the start circuit 900. The relays 9A0 and 9A1 function together with the relays 14A2 and 14A4 to indicate the line tens indication and the relays 14B0, 14B1, 14B2, 14B4 and 14B7 function to indicate a line units indication. The relays 14B0 and 14B1 are connected through the varistor circuit 14D1, the operated armature 2 of relay 9VGA0, the normal armature 2 of relay 9NTR0, lead 6L3, and the normal armature 3 of relay 6TR0 to the control lead 3C3; the relays 14B2 and 14B4 are connected through the varistor circuit 14D2, the operated armature 3 of relay 9VGA0, the normal armature 3 of relay 9NTR0, lead 6L4, and the normal armature 4 of relay 6TR0 to the control lead 3C4 and the relays 14A2 and 14A4 are connected through the varistor circuit 14D5, lead 14A1, the operated armature 1 of relay 9VGA0, the normal armature 1 of relay 9NTR0, lead 6L2, and the normal armature 2 of relay 6TR0 to the control lead 3C2. Each of the varistor circuits 14D1–5 includes four varistors 14V1–4 which are connected in a manner similar to that described above for the varistors 9V1–4 which are associated with the relays 9A0 and 9A1. In accordance with the signals provided by the concentrator C0 to identify the calling line 1L00, as shown in Fig. 18 and described above, when relay 9VGA0 operates it provides for the operation of the relays 14A4, 14B4 and 14B7. The relay 14B7 is shunted by the varistor 14V5 and is connected, upon the operation of relay 9VGA0, to the control lead 3C5 through the varistor 14V6 which is poled in a direction of positive current from the central office. The operating path for the relay 14A4, for example, is from the alternating-current source 14AC3, the winding of relay 14A4, varistor 14V4 of the diode circuit 14D5, lead 14L1, the operated armature 1 of relay 9VGA0, the normal armature 1 of relay 9NTR0, lead 6L2, the normal armature 2 of relay 6TR0, control lead 3C2, the normal armature 2 of relay 3TR, diode 3D6 and the operated armature 1 of relay 2LT0 to ground. In this manner the operation of the translator circuit 1400 together with the operation of the relays 9A0–1 in the start circuit 900 provide for a registration of the signals supplied from the concentrator C0 which indicate the identity of the substation from which a call is being originated.

In the illustrative example described herein, the call is originated at the substation 1S00 and current from the central office is through the control leads 3C1 and 3C2 to indicate a line tens digit 0 and through the control leads 3C4 and 3C5 to indicate a line units digit, also of 0. The relays in the translator circuit 1400 that are operated may be readily determined from the chart shown in Fig. 18. For the control lead 3C1 a + indicates that the relay 9A1 is operated and a — indicates that the relay 9A0 is operated; for the lead 3C2 a + indicates that relay 14A4 is operated and a — indicates that the relay 14A2 is operated; for lead 3C3 a + indicates that relay 14B1 is operated and a — indicates that relay 14B0 operates; for the lead 3C4 a + indicates that the relay 14B4 is operated and a — indicates that the relay 14B2 is operated; and finally for the lead 3C5 a + indicates that the relay 14B7 is operated. When a call is originated from the substation 1S00, therefore, the following relays are operated; relays 9A1, 14A4, 14B4 and 14B7. The operation of the relays 9A1 and 14A4 provides an indication of the vertical file, which is 0, to the line link connector 1301 and thence through cable 13C10 to the marker 1305. The vertical file indication is provided by connecting ground at the operated armature 6 of relay 9A1, through the operated armature 6 of relay 9VGA0, lead 14L2, the operated armature 1 of relay 14A4 and cable 13C5 to the line link connector 1301. Two of the four relays 9A0, 9A1, 14A2 and 14A4 operate to indicate the tens digit or vertical file 0 through 4. In a similar manner two out of five of the relays 14B0, 14B1, 14B2, 14B4 and 14B7 operate to indicate one of the ten line units digits 0 through 9 as a horizontal group indication. With the relays 14B4 and 14B7 operated, ground is connected through the normal armature of relay 14B0, the normal armature 2 of relay 14B1, the normal armature 1 of relay 14B2, the operated armature 2 of relay 14B4, the operated armature 2 of relay 14B7, the lead 14HG0 and cable 13C4 to the line link marker connector 1300. In this manner the operation of the relays 9A0, 9A1 and the relays in the translator circuit 1400 perform a translation from the two-out-of-four and two-out-of-five codes from the concentrator C0 to one-out-of-five and one-out-of-ten decimal codes. The decimal indications are passed from the connectors 1301 and 1300 to the marker 1305 as vertical file and horizontal group indications, respectively.

Briefly summarizing, the identity of the line units digit is provided as a horizontal group indication through the cable 13C4, the line link marker connector 1300 and the cable 13C9 to the marker 1305 and the line tens digit is provided as the vertical file indication through the cable 13C5 or 13C2, the line link connector circuit 1301 and cable 13C10 to the marker 1305. The marker 1305 now has the line link frame identification, the vertical group or concentrator identification, the horizontal group or line units identification and the vertical file or line tens identification.

When the marker 1305 has obtained this information and connected to the line link frame, including control 290, through the line link connector 1301, it operates the common control circuit 700 in accordance with the vertical file and horizontal group information received from the concentrator control 290 and also selects one of the trunks 3T0–9. The marker 1305 operates one of the ten horizontal group relays 6HG0–9 and one of the five vertical file relays 6VF0–4, in accordance with the horizontal group and vertical file information, over a path through the cable 13C10, the line link connector 1301 and cable 13C2. At the same time that one of the horizontal group relays 6HG0–9 and one of the vertical file relays 6VF0–4 in the common control circuit 700 are operated, the marker 1305 operates one of the ten vertical group preference relays 9VGP0–9 in the start circuits 900. In the illustrative example described herein the relays 6HG0, 6VF0 and 9VGP0 are operated. Relay 6VF0 is operated from the line link connector 1301 over a path through the cable 13C2, the winding of relay 6VF0 to battery 6B1, relays 6HG0 and 9VGP0 are operated over a path from ground through its winding over a path through the cable 13C2 to the line link connector 1301. The operation of relay 6VGP0 indicates that the call being served is from or to a substation connected to the concentrator C0 and the operation of relays 6HG0 and 6VF0 indicates the identity of the substation.

Since the marker 1305 has received from the concentrator C0 all the information necessary for setting up the call and recorded this information in the common control circuit 700 and signal circuit 9SIG0, the control leads 3C1–5 which were utilized for receiving this information from the concentrator C0 can now be used for setting up the connection thereat. When relay 9VGP0 is operated, it in turn causes relay 9VGB0 to operate over a path from ground through its winding, the operated armature 2 of relay 9VGP0, through the serially connected normal armatures 4 of the relays 11TP0–9 to the battery 11B1. If any one of the ten relays 11TP0–9 is operated at this time, the relay 9VGB0 does not operate and central office-to-concentrator signals, hereinafter described, are delayed. One of the relays 11TP0–9 will be operated, as hereinafter described, during disconnect so that if a disconnect sequence of operations is taking place and one of the relays 11TP0–9 is operated, serving the originating call from one of the subscriber lines 1L00–47 connected to the concentrator C0 is halted or delayed. In a similar manner, also as hereinafter described, if the relay 9VGB0 is first operated the operation of the relay 11TP0–9 does not occur and the disconnect sequence of operations is delayed. The operation of the relay 9VGB0 causes the serial operation of relay 6TR0 in transfer circuit 6T0, and relays 3TR and 3L0 in circuit 300 in concentrator C0. When relay 9VGB0 operates, the battery 8B1 is connected through the resistor 8R1, the operated armature 1 of relay 6VF0, the operated armature 3 of relay 6HG0, lead 6L8, the normal armature 5 of relay 12CB, the operated armature 5 of relay 9VGB0, lead 6L7, the winding of relay 6TR0 in the transfer circuit 6T0, the control lead 3C6, the winding of the relay 3TR, the varistor 3D11 which shunts the winding of relay 3H1, preventing it from operating, through the winding of the relay 3L0 and the normal armature 3 of relay 3NTA to ground. The relays 6TR0, 3TR and 3L0 in this manner are serially operated upon the operation of relays 6HG0, 6VF0 and 9VGB0. The battery potential applied through lead 3C6 will be positive if the line number being served is being 00 and 23 and negative if it is between 24 and 47. In the illustrative example described herein, the call is originated from the substation 1S00 so that the line number is 00 and the battery potential applied is positive. When the line number is between 00 and 23, battery 8B1 is connected to lead 3C6 and the relay 3L0 is operated in series with the relays 3TR and 6TR0 as an indication thereof. When the line number is between 24 and 27, battery 8B2 is connected to lead 3C6 through one of the resistors 8R6–10 and relay 3H1 is operated instead of relay 3L0.

When relays 3TR and 6TR0 operate, the operating paths for relays 9A1, 14A4, 14B4 and 14B7 are opened causing them to release to allow the translator 1400 to return to normal.

The operation of the relays 6TR0 and 3TR also causes the operation of the relays 4A+ and 4C+ in the translator circuit 400 to register the line number indication which is sent on a two-out-of-eight signaling arrangement from the common control circuit 700 in the central office. The chart in Fig. 19 indicates the selective operation of the relays 4A+, 4A—, 4B+, 4B—, 4C+, 4C—, 4D+ and 4D— in the translator circuit 400. For example, when the relays 6HG0 and 6VF0 in the circuit 700 are operated, a path is provided from the battery 8B1 through resistor 8R2, the operated armature 2 of relay 6VF0, the operated armature 10 of relay 6HG0, the operated armature 1 of relay 6TR0, lead 3C1, the operated armature 1 of relay 3TR, lead 4L1 through the windings of relays 4A— and 4A+ to ground. The windings of the relays 4A+ and 4A— are shunted by the oppositely poled varistors 4V1 and 4V2, the junction of which is connected to the junction between the windings of relays 4A+ and 4A—. The positive battery 8B1 causes the operation of the relay 4A+ and not of the relay 4A— which is substantially short-circuited by the varistor 4V2. In a similar manner, a path is provided from the battery 8B1 to the relay 4C+ in translator circuit 400 causing it to operate. The operating path for relay 4C+ is from battery 8B1 through the resistor 8R4, the operated armature 4 of relay 6VF0, the operated armature 5 of relay 6HG0, the operated armature 3 of relay 6TR0, lead 3C3, the operated armature 3 of relay 3TR, lead 4L3 through the serially connected windings of relays 4C— and 4C+ to ground. The windings of relays 4C+ and 4C— are shunted in a similar manner as the windings of relays 4A+ and 4A— by a pair of oppositely poled varistors 4V5 and 4V6 which prevent the relay 4C— from operating and allow the relay 4V5 to operate when a positive potential is provided over the control lead 3C3 from the central office. The line number is therefore sent over the control leads 3C1–5 on a two-out-of-eight signaling arrangement omitting the four combinations that require two signals on the same lead. This signaling system provides a maximum of 24 possible combinations which are transmitted in accordance with the table shown in Fig. 19. The number of possible combinations is doubled resulting in a maximum of 48 line numbers by utilizing either a + or a — signal on the control lead 3C6 to operate as described above either the relay 3L0 or the relay 3H1. This system of signaling results in a code easily checked, easily translated and without the need for marginal relay operation.

Direct-current signaling is utilized from the central office to the concentrator also to reduce the marker holding time necessary for establishing line-to-trunk connections. Marker holding time is an expensive item in crossbar telephone systems due to the great cost of a marker 1305. In fact marker holding is generally valued at more than 60 dollars per millisecond per marker. The number of markers 1305 that is utilized in a marker group depends upon the number of lines and the marker holding time for serving a call. The marker holding time for obtaining dial tone, or for establishing a line-to-register connection, in the No. 5 crossbar system described in the above-identified patent to Busch is approximately four tenths of a second. If the signaling system from the central office to the concentrator C0 were to take 30 or 40 milliseconds it would increase the marker holding time 10 percent or increase by at least 10 percent the number of markers 1305 needed in a marker group. The alternating-current simplex signaling system, for example, which is utilized in the concentrator system of the present invention to signal from the concentrators C0–9 to the central office has a relatively lengthy signaling duration: the translator circuit 1400 requires approximately 32 milliseconds. The alternating-current simplex signaling may be utilized to signal from the concentrators C0–9 to the central office because the marker 1305 at that time is not being held. Increased marker holding time is therefore not a factor. Alternating-current simplex signaling is utilized because it avoids the utilization of additional potential source at the concentrators C0–9. Moreover power is supplied from the central office because power sources at the central office provide maximum reliability. If direct-current signaling were utilized, for example in signaling from the concentrators C0–9, a positive and negative potential source would have to be supplied at each of the concentrators C0–9 or supplied thereto, with accompanying power dissipation, from the central office.

The direct-current signals cause the translator 400 to operate in approximately 6 milliseconds which results in a relatively small increase in marker holding time.

Another factor in determining the use of direct-current signaling from the central office in addition to marker holding time is the desire to restrict the number of control leads 3C1–6. Alternating-current simplex signaling, as described above, utilizes five control leads 3C1–5 whereas the direct-current signaling utilizes only four control leads 3C1–4. The operation of the relays 3L0 and 3HI is over the transfer control lead 3C6 which is mainly utilized for the transfer function. The fifth lead 3C5, which is not utilized to signal the identity of the line from the central office to the concentrator C0, is utilized, as is hereinafter described, for no-test and also busy test calls. If all five control leads 3C1–5 were utilized to signal from the central office an additional control lead would be necessary for no-test and busy test calls.

The two-out-of-eight signal method, described above, is most easily translated into an octal system. The octal translation apparatus consists of six relays 3E0–5 and eight relays 3U0–7 in the number group and transfer circuit 300. One of the relays 3E0–5 and one of the relays 3U0–7 are operated upon the operation of two of the relays in the translator circuit 400. When the relays 4A+ and 4C+ are operated for example, the relays 3E0 and 3U0 are operated, with relay 3E0 operating over a path from ground through the operated armature 4 of relay 4A+, the operated armature 5 of relay 4C+, the operated armature 1 of relay 3L0 and the winding of relay 3E0 to the battery 3B0. Relay 3U0 is operated over a path from ground through the operated armature 2 of relay 4A+, the operated armature 1 of relay 4C+, the winding of relay 3U0 to the negative battery 3B10. The contacts of the number group relays 3E0–5 and 3U0–7, as is hereinafter described, are used to make busy tests by readying an operating path for the line busy relay 12LB, and also to control the operation of the trunk circuits 1T0–9 which function to establish a connection between any one of the trunks 3T0–9 and the calling subscriber's line 1L00.

At the same time that the marker 1305 was connected to the line link frame in which the concentrator C0 appeared and operated the vertical group relay 9VGB0, it also obtained access to the leads 14LL0–9 and the line busy leads 9LB0–9 through the cables 13C5 and 13C2, respectively, and the line link connector 1301 for selecting an idle link or trunk 3T0–9 to be used in setting up the call. When the marker 1305 selects an idle link, which is indicated by the absence of ground on the corresponding ones of the leads 14LL0–9 and 9LB0–9, it proceeds to connect a source of potential, not shown, to the associated one of the select magnets 12SM0–9 and applies ground to one of the hold magnets 11HM0–9. Ground is applied through cable 13C7 to operate one of the hold magnets 11HM0–9 connected to batteries 11B13 to connect, upon the operation of one of the select margets 11SEL0–9, a horizontal of the frame 11LLF to the trunk frame 1303. For example, when the marker 1305 selects the idle link or trunk 3T9 after determining in the absence of ground upon leads 14LL9 and 9LB9 that it is idle, it connects a source of potential in the marker 1305 through the cable 13C10, the line link connector 1301, the cable 13C6, the lead 12S9, the winding of the select maget relay 12SM9 through the ninth normal contact A of the relay 12XSM to ground causing the relay 12SM9 to operate. Immediately thereafter the marker 1305 applies ground through the cable 13C10, the line link connector 1301 and the cable 13C2 to one of the line hold leads 6LH0–4 to operate the line hold relay 12LH in the connector circuit 1200. In the No. 5 crossbar system of the type disclosed in the above-identified patent to Busch, there is one line hold magnet for each vertical file so that ordinarily five line hold magnets are utilized. In the concentrator control circuit 700, however, the leads 6LH0–4 are grouped together after passing through armatures 9 of the vertical file relays 6VF0–4 and are used to operate the common line hold relay 12LH. In the illustrative example described above, the originating call identifying number is 00 so that the marker 1305 applies ground to the lead 6LH0 in accordance with a vertical file indication of 0. The lead 6LH0 is connected through the operated armature 9 of relay 6VF0, the normal armature 2 of the line busy relay 12LB and the winding of relay 12LH to the battery 12B3.

When the relay 12SM9 operates, it in turn causes the operation of the select magnet 11SEL9 which is a part of the crossbar switch or line link frame generally designated as 11LLF in the trunk control circuit 1100. The operating path for the select magnet 11SEL9 is from ground through the winding of the magnet 11SEL9, the operated ninth armature D of relay 9VGB0, the operated armature 2 of relay 12SM9 and the lamp 12IN2 to the battery 12B9. When the marker 1305 operates the select magnet relay 12SM9, it locks to ground through its armature 4 and it connects battery 12B9, as described above, to the winding of associated select magnet 11SEL9. The windings of the other nine select magnets 11SEL0–8 are connected in parallel through back contacts of the armatures 2 of the associated select magnet relays 12SM0–9 to the winding of the relay 12XSM. A cross between two connections will cause the relay 12XSM to operate and apply battery 12B9 through the nine leads 12S0–8 to the marker 1305 as a trouble indication.

The crossed select magnet relay 12XSM operates to provide an indication from battery 12B9 through the lamp 12IN2, the operated armature 1 of relay 12XSM, the nine normal armatures 5 of relays 12SM0–8, leads 12S0–8, cable 13C6, the line link connector 1301 and cable 13C10 to the marker 1305.

When the relay 12LH and the relay 12SM9 have operated, a path is completed for operating the associated relay 11TP9 of the trunk preference relays 11TP0–9 in the control circuit 1100. The operating path for the relay 11TP9 is from ground at the normal armature 1 of the line busy relay 12LB through the operated armature 3 of relay 12LH, the operated armature 6 of relay 12SM9, the operated ninth armature B of relay 9VGB0 through the upper winding of relay 11TP9 to the associated battery 11B1. The operation of the trunk preference relay 11TP9 connects a positive high voltage potential source 11B5 over both sides or leads of the trunk 3T9 to the concentrator C0 through the resistors 11R9 and the operated armatures 1 and 2 of the relay 11TP9.

Each one of the trunks 3T0–9 has associated therewith one of the trunk circuits 1T0–9 which functions to provide a connection between any one of the trunks 3T0–9 and any one of the subscribers' lines 1L00–47. The ring lead 3RI9 of the trunk 3T9 is connected through the resistor 1A9 to the main anode of the triode gaseous tube 1CA9 in the trunk circuit 1T9. The tip lead 3TI9 of the trunk 3T9 is connected to the starting anode of the tube 1CA9 and to ground through the series circuit consisting of the resistor 1AA9 and the capacitor 1CC9. The main anode of tube 1CA9 is shunted to ground through the capacitor 1C9 and the cathode of tube 1 CA9 is connected through the winding of the trunk relay 1TK9 to ground. The application of the positive potential from source 11B5 in the central office control circuit 1100 to trunk 3T9 causes the cold cathode tube 1CA9, which is associated as described above with the trunk 3T9, to ionize and the trunk relay 1TK9 to operate. The combination of the operation of one of the trunk relays 1TK0–9 together with one of the relays 3E0–5 and one of the relays 3U0–7 in the number group and transfer circuit 300, which were operated as described above, provides a path for operating one of the relays 1TE90–95 and one of the relays 1TU90–97 in the trunk circuit 1T9. With relays 1TK9, 3E0 and 3U0 operated, operating paths are completed for relays 1TU90 and 1TE90 in the trunk circuit 1T9. The operating path for relay 1TU90 is from ground through the operated armature 1 of relay 1TK9, the operated armature 9 of relay 3U0 and the winding of relay 1TU90 to battery 1B90 and the operating path for relay 1TE90 is from ground through the operated armature 2 of relay 1TK9, the operated armature 9 of relay 3E0 and the winding of relay 1TE90 to battery 1A90.

There is only one set of relays 3E0–5 and 3U0–7 but there are ten sets of corresponding relays in the trunk circuits 1T0–9. In the illustrative example described herein with the selection of the trunk 3T9 by the marker 1305, relay 1TK9 is operated and the relays 3E0 and 3U0 which indicate a subscriber's number 00 corresponding to the substation 1S00 are operated to provide a path between the selected trunk 3T9 and the calling line 1L00. The path from the tip lead 1T00 is through the operated armature 1 of relay 1TU90 in the trunk circuit 1T9, the operated armature 1 of the relay 1TE90 to the tip lead 3TI9 of the trunk 3T9 and the path from the ring lead 1R00 is through the operated armatures 2 of relays 1TU90 and 1TE90 to the ring lead 3RI9 of the trunk 3T9. The operation of the relays 1TU90 and 1TE90 also provides a path for operating the cut-off relay 2C00 in the line circuit 200. The operating path for relay 2C00 is from ground through the varistor 3D13, the operated armature 6 of relay 1TU90, the operated armature 4 of the relay 1TE90 and the winding of relay 2C00 to the negative potential source 2X00. The relay 3NT9 does not operate at this time due to the effect of the varistor 3D13 which prevents it from operating upon connection to a negative source of potential. The cut-off relays 2C00–47 in the line circuit 200 are associated respectively with the subscriber lines 1L00–47 and, as hereinafter described, the no-test relays 3NT0–9 are associated respectively with the trunks 3T0–9.

When relay 2C00 operates, it releases the line identifier and lockout circuit 200 by opening the operating path for relay 2L00. When relay 2L00 releases, it in turn releases relays 2LU0 and 2LT0 and extinguishes the diodes 2U0 and 2T0. When relays 2LU0 and 2LT0 release, the selective paths to the diodes 3D1–9 in circuit 300 are opened. The relay 9A1 and the translator 1400 were released, as described above, when relays 3TR and 6TR0 operated.

When the number group relays 3E0 and 3U0 operated, a path was readied for the line busy relay 12LB, as briefly described above, by connecting the winding of relay 12LB over the control lead 3C5 to the winding of the cut-off relay 2C00 of the calling line 1L00. When the trunk circuit 1T9 is operated and ground is applied to operate the cut-off relay 2C00 the same ground is extended to and operates the line busy relay 12LB in the circuit 1200 as an indication that the line-to-trunk crosspoints are closed or that the trunk circuit 1T9 was operated. The winding of the relay 12LB which is connected to the battery 12B2 is connected through the lead 10L1, the operated armature 5 of the transfer relay 6TR0, the control lead 3C5, the operated armature 5 of the transfer relay 3TR, the operated armature 10 of the relay 3E0, the operated armature 10 of relay 3U0, the operated armature 4 of relay 1TE90, the operated armature 6 of relay 1TU90 and the diode 3D13 to ground. The operation of relay 12LB opens, at its armature 1, the operating circuit described above for the trunk preference relay 11TP9 in the control circuit 1100. As described above, the operating path for relay 11TP9 was through the operated ninth armature B of relay 9VGB0, the operated armature 6 of relay 12SM9, the operated armature 3 of relay 12LH through the normal armature 1 of relay 12LB to ground. When relay 11TP9 releases, it removes the source 11B5 from the trunk 3T9 causing the trunk relay 1TK9 in the trunk circuit 1T9 to release and the triode 1CC9 also in circuit 1T9 to return to normal. Relays 1TE90 and 1TU90 which were operated respectively through the operated armatures 1 and 2 of relay 1TK9 remain operated through the back contacts of the normal armatures 1 and 2 of relay 1TK9 and their respective operated locking armatures 5 and 3.

When relay 12LB in the central office connector circuit 1200 operates, it also closes a path through the lead 6LH0 from the line link connector 1301 to the winding of the sleeve relay 11S9 in the control circuit 1100 causing it to operate. The path from lead 6LH0 is through the operated armature 9 of relay 6VF0, the operated armature 2 of relay 12LB, the operated armature 1 of relay 12LH, the operated armature 3 of relay 12SM9, the operated ninth armature C of relay 9VGB0 through the winding of relay 11S9 to the associated battery 11B2. The operation of the relay 11S9 in turn causes the operation of the corresponding slow release relay 11SR9 by connecting ground through its operated armature 4 and the winding of relay 11SR9 to the associated battery 11B4. When relay 11S9 operates, it closes the link tip lead 11T9 and the link ring lead 11R9 through its operated armatures 1 and 2 and the normal armatures 1 and 2 of the relay 11TP9, respectively, to the tip lead 3TI9 and the ring lead 3RI9 of the trunk 3T9 to the concentrator C0. The line hold lead 6LH0 which was extended through the operated armature 2 of relay 12LB as described above to the winding of relay 11S9 is extended therefrom through its operated armature 3 to the sleeve lead 11SL9 as an indication to the marker 1305 that the crosspoints are closed. When relay 11SR9 operates, it locks to ground through its operated armature 2 and the normal armature 5 of relay 11TP9, and it connects the grounded resistor 11R19 through its operated armature 3 and the operated ninth armature F of relay 9VGB0, the lead 14LL9 and cable 13C5 to the line link connector 1301.

In this manner the subscriber's line 1L00 is connected through the trunk circuit 1T9, the trunk 3T9 through the central office trunk control circuit 1100 and cable 13C7 to the trunk frame 1303. The trunk frame 1303 is connected to an originating register 1306 under control of the marker 1305 through cables 13C12 and 13C13 to provide dial tone to the line 1L00. After the marker 1305 connects the register 1306 to frame 1303 it releases and in turn releases all the relays shown in Figs. 1 through 14 except the relays 1TU90, 1TE90 and 2C00 at the concentrator C0 and the relays 11S9 and 11SR9 and the selected one of hold magnets 11HM0–9 in the central office which remain operated for the duration of the call. When the marker 1305 releases or disconnects, it releases relays 6HG0, 6VF0, 9VGA0, 9VGP0, 12SM9 and 12LH. When relay 9VGP0 releases, it in turn releases relay 9VGB0 and when relays 6HG0 and 6VF0 release, they in turn release relays 6TR0, 3TR, 3L0, 12LB, 4A+ and 4C+. When relays 4A+, 4C+ and 3L0 release, they in turn release the number group relays 3E0 and 3U0. The relays 1TU90 and 1TE90 remain operated through their locking paths and relay 2C00 remains operated through the operated armatures 6 and 4, respectively, of relays 1TU90 and 1TE90. When relay 9VGB0 releases, it opens the operating path for select magnet 11SM9 which releases. The crosspoint through the frame 11LLF remains locked however under control of the operated one of the hold magnets 11HMO–9.

When dial tone is received at the substation 1L00 and the called subscriber's number is dialed, it is registered in the originating register 1306. After the dialed number is recorded in the originating register 1306, the established connection between the calling line 1L00 and the originating register 1306 is released and a new connection from the calling line 1L00 to the trunk frame 1303 to the called line, not shown, is established. When dialing is completed the originating register 1306 summons a marker 1305 through cable 13C13, passes to it the information necessary to complete the call including the trunk selection 3T9, the calling line identification 00, and a record of the frame linkages used on the line-to-register connection. The marker 1305 then releases the register 1306 and proceeds to establish the line-to-trunk connection after having ascertained that a linkage therefore is available.

A call-back call in conjunction with a concentrated line, such as 1L00, is somewhat more complex than one in conjunction with a regular line not connected to a concentrator, such as concentrator C0, because of the fact that the line-to-trunk connection at the concentrator C0 is locked operated and must receive a distinct release signal in order to disconnect. This connection must be released on each call-back call because the link selected to complete the line-to-trunk connection may not be the same as that used for the register connection. The marker 1305 makes use of recorded line linkages to release the line-to-register connection at the concentrator C0 before establishing the line-to-trunk connection. When the marker 1305 is ready to establish the line-to-trunk linkage, it selects the line link frame in which the concentrator C0 appears in the regular manner as described in the above identified patent to Busch and operates through cable 13C10, connector 1301 and cable 13C2 the relays 9VGP0, 6HG0 and 6VF0 and also, as is hereinafter described, the relay 12LD9. It also operates the call-back relay 12CB in the circuit 1200 through cable 13C10, the line link connector 1301 and cable 13C6. The operation of the call-back relay 12CB in turn energizes the timing relay 12TM by applying ground through its operated armature 3 and the serially connected normal armatures 1 of relays 12LD9–0 and the winding of relay 12TM to the battery 12B6. The timing relay 12TM functions to delay the operation of the transfer circuit 6T0 in order to prevent operating the number group relays 3E0–5 and 3U0–7 in the number group and transfer circuit 300 at the concentrator C0. The number group relays 3E0–5 and 3U0–7 must remain non-operated while the linkage in use is being released because the presence of a trunk signal is used to disconnect and the presence of a trunk signal in combination with the line number is used to connect a line-to-trunk circuit at the concentrator C0. The relay 12TM is utilized to control the length of time allowed for releasing the trunk circuit 1T9 in the concentrator C0. When the relay 12TM finally operates, it in turn causes the operation of relay 12TM1 by connecting ground through its operated armature 4 and the winding of relay 12TM1 to battery 12B7. When relay 12TM1 operates, it locks to ground through its operated armature 2 and the operated armature 1 of the call-back relay 12CB and also connects ground through its operated armature 1 and the operated armature 1 of relay 12TM through the winding of relay 12TM2 to battery 12B8 causing relay 12TM2 to operate.

When the marker 1305 has determined that there is a path available to the called line or outgoing trunk from the trunk frame 1303, it releases the originating register and at the same time operates the disconnect relay 12LD0–9 which corresponds with the link or trunk 3T0–9 that was used on the line-to-register connection. In the illustrative example described above, trunk 3T9 was utilized so that relay 12LD9 is operated over a path from the winding thereof through cable 13C6, the line link connector 1301 and cable 13C10 to battery, not shown, in marker 1305. When relay 12LD9 operates, it causes the linkage from the line 1L00 to the originating register to be disconnected or open at the concentrator C0. When relay 12LD9 operates, it opens at its armature 1 the operating path for the slow release timing relay 12TM and closes an operating path for relay 11TP9 in the trunk control circuit 1100. The operating path for relay 11TP9 is from ground through the operated armature 3 of relay 12TM, which has not as yet released, the operated armature 2 of relay 12LD9, the operated ninth armature B of relay 9VGB0, which operated under control of relay 9VGP0, the winding of relay 11TP9 to the associated battery 11B1. When relay 11TP9 operates, it applies the positive potential source 11B5 through resistors 11R9 and the operated armatures 1 and 2 of relay 11TP9 to the trunk 3T9 causing the ionization of the tube 1CC9 and the operation of the trunk relay 1TK9 in the trunk circuit 1T9 in a similar manner as described above for establishing the connection from the subscriber's line 1L00 to the originating register 1306. With the number group relays 3E0–5 and 3U0–7 remaining normal the operation of the trunk relay 1TK9 removes ground from the windings of relays 1TE90 and 1TU90 causing them to release and to open the connection from the line 1L00 to the trunk 3T9 and to release the relay 2C00.

At the end of the timed interval, the relay 12TM in circuit 1200 releases to, in turn, release the relay 11TP9, the operating path of which as described above was through the operated armature 3 of relay 12TM. When relay 11TP9 releases, it removes the disconnect potential from trunk 3T9 and opens the operating path at its armature 1 for the relay 12TM2 causing it to release. Relay 12TM2 is also a slow-to-release relay in order to allow sufficient time for the trunk relay 1TK9 in the trunk circuit 1T9 to release. When the relay 12TM2 finally releases, with relay 12TM1 still locked operated, a circuit is completed for operating the relay 6TR0 in the transfer circuit 6T0 and the transfer relay 3TR in the number group and transfer circuit 300 to permit connecting the subscriber's line 1L00 to one of the trunks 3T0–9 as selected by the marker 1305 in a similar manner as described above for establishing the line-to-register connection. The operating path for relays 6TR0 and 3TR and also relay 3L0 is from battery 8B1 through resistor 8R1, the operated armature 1 of relay 6VF0, the operated armature 3 of relay 6HG0, lead 6L8, the operated armature 3 of relay 12TM1, the normal armature 1 of relay 12TM2, the normal armature 2 of relay 12TM, the operated armature 6 of relay 9VGB0, lead 6L7, the winding of relay 6TR0, control lead 3C6, the winding of relay 3TR, diode 3D11 shunting the winding of relay 3H1, the winding of relay 3L0 and the normal armature 3 of relay 3NTA to ground. Relays 6TR0, 3TR and 3L0 are in this manner operated. With the transfer relays 6TR0 and 3TR being operated, coded signals representing the identity of the calling line 1L00 are sent under control of the control circuit 700 in a similar manner as described above for establishing a line-to-register connection to operate the translator circuit 400. Relays 4A+ and 4C+ are operated in the translator circuit 400 to register the number 00, in accordance with the chart shown in Fig. 19, which corresponds to the calling subscriber and in turn cause the operation of the number group relays 3E0 and 3U0.

Assume for example that trunk 3T0 is selected by the marker 1305 for the call-back call. At the same time that the marker 1305 operated the relays 6HG0, 6VF0, etc., the marker 1305 also operates the relays 12SM0 and 12LH which, in turn, cause the operation of relay 11TP0. When relay 11TP0 operates, it applies an operating potential from battery 11B1 through resistor 11R0 and the operated armatures 1 and 2 of relay 11TP0 to the trunk 3T0 to cause tube 1CA0 to ionize and the trunk relay 1TK0 to operate. The operation of the relays 3E0, 3U0 and 1TK0 together form operating paths for the relays 1TU00 and 1TE00 in the trunk circuit 1T0 to provide a connection between the line 1L00 through trunk 3T0 to the central office. The operating path for relay 1TU00 is from ground through the operated armature 1 of relay 1TK0, the operated armature 0 of relay 3U0 and the winding of relay 1TU00 to battery 1B00. The operating path for relay 1TE00 is from ground through the operated armature 2 of relay 1TK0, the operated armature 0 of relay 3E0, and the winding of relay 1TE00 to battery 1A00. When relays 1TU00 and 1TE00 operate they provide a path through their operated armatures 1 and 2 from line 1L00 to trunk 3T0 and also provide another operating path for relay 2C00 from ground through the diode 3D12, the operated armature 6 of relay 1TU00, the operated armature 4 of relay 1TE00, and the winding of relay 2C00 to battery 2X00. The diode 3D12 which shunts the relay 3NT0 prevents it from operating at this time.

When relays 1TU00 and 1TE00 operate, an operating ground is also provided to the winding of relay 12LB through the diode 3D12, the operated armature 6 of relay 1TU00, the operated armature 4 of relay 1TE00, the operated armatures 10 of relays 3U0 and 3E0, the operated armature 5 of relay 3TR, the control lead 3C5, the operated armature 5 of relay 6TR0 and lead 10L1. When relay 12LB operates it opens at its armature 1 the operating path for relay 11TP0 causing it to release and remove the connect potential from trunk 3T0. When the connect potential is removed, relay 1TK0 releases and tube 1CA0 deionizes. Relays 1TU00 and 1TE00 remain operated from ground through the contacts of the normal armature of relay 1TK0. When relay 12LB operates, it also closes a path from lead 6LH0 through the operated armature 9 of relay 6VF0, the operated armature 2 of relay 12LB, the operated armature 1 of relay 12LH, the operated armature 3 of relay 12SM0, the operated 0 armature C of relay 9VGB0 through the winding of relay 11S0 to the associated battery 11B2 causing relay 11S0 to operate. When relay 11S0 operates, it in turn operates the slow release relay 11SR0 and closes the link tip lead 11T0 and the link ring lead 11R0 through its operated armatures 1 and 2 and the normal armatures 1 and 2 of relay 11TP0, respectively, to the trunk 3T0. When relay 11S0 operates, it also extends its operating ground path through its operated armature 3 to the sleeve lead 11SL0 and when relay 11SR0 operates, it connects the grounded resistor 11R10 through its operated armature 3, the operated 0 armature F of relay 9VGB0, lead 12L1, lead 14LL0 through cable 13C5 to the connector 1301.

When the marker 1305 receives the indication of crosspoint closure by the sleeve ground through the trunk frame 1303, it operates the trunk frame 1303 to connect an outgoing trunk, not shown, through the tip and ring links 11T0 and 11R0 and trunk 3T0 to the concentrator C0. In this manner the line 1L00 is connected through trunk circuit 1T0, trunk 3T0, circuit 1100, cable 13C7, and the trunk frame 1303 to an outgoing trunk.

When the connection from line 1L00 to outgoing trunk is completed as evidenced by the grounded sleeve link 11SL0 and an indication from the trunk frame 1303, the marker 1305 disconnects from the line and trunk frames. When the marker 1305 releases, it releases relays 6HG0, 6VF0, 9VGA0, 9VGP0, 12SM0, 12LH and 12CB. When relay 9VGP0 releases, it in turn releases relay 9VGB0 and when relay 12CB releases, it releases relay 12TM1. When relays 6HG0 and 6VF0 release, they in turn release relays 6TR0, 3TR, 3L0, 12LB, 4A+ and 4C+ and when relays 4A+ and 4C+ release they in turn release the number group relays 3E0 and 3U0. The relays 1TU00 and 1TE00 remain operated from ground at the normal armatures of relay 1TK0. When relay 9VGB0 releases, it in turn releases the select magnet 11SM0 but the crosspoint in the frame 11LLF remains closed under control of the operated one of the hold magnets 11HM0–9. Only the relays 1TU00, 1TE00 and 2C00 remain operated in the concentrator C0 and the relays 11S0, 11SR0, and the selected one of the hold magnets 11HM0–9 remain operated in the concentrator control 290.

*Disconnect*

When the calling or the called subscriber hangs up, ground is removed from the sleeve lead 11SL0 of the switching circuit or frame 11LLF by the trunk frame 1303 allowing the sleeve relay 11S0 to release. If no call is in progress in the line link frame, the associated preference relay 11TP0 is operated over a path from ground through the normal armature 4 of relay 11S0, the operated armature 1 of relay 11SR0, the lower winding of relay 11TP0, the normal armature 1 of relay 9VGP0, the normal armature 1 of relay 9VGP9 to battery 108 in signal circuit 9SIG9 causing relay 11TP0 to operate. When relay 11TP0 operates, it applies the battery 11B10 through the resistors 11R0 to the tip and ring of the trunk 3T0 and also opens the locking circuit of relay 11SR0 at armature 5 of relay 11TP0 allowing it to release. The application of a positive potential to the trunk 3T0 causes the ionization of tube 1CA0 and the operation of relay 1TK0 which removes locking ground from relays 1TE00 and 1TU00. When relays 1TE00 and 1TU00 release, they in turn cause the release of relay 2C00.

When relay 11S0 releases, it also releases relay 11SR0. When the slow release relay 11SR0 releases, it in turn releases the relay 11TP0 which removes the disconnect potential source 11B10 from the trunk 3T0 to release relay 1TK0 and deionize tube 1CA0 returning concentrator C0 to normal.

If a call is in progress in the line link frame when either the called or calling subscriber disconnects, the relay 11SR0 locks operated through the back contact of armature 5 of relay 11TP0 which cannot operate until the existing call is served. If another call is being served by the line link frame, one of the relays 9VGP0–9 is operated and the operating paths for relays 11TP0–9 are open at armature 1 thereof. In the meantime the linkage through trunk 3T0 is held busy over the line link lead 14LL0 which is grounded through the contacts of relay 11SR0. When relay 11VGB0 releases after the other call is served, relay 11TP0 operates to complete the disconnect sequence described above. It is necessary, as described above, that facilities be available at the central office to record the existence of a call on trunk 3T0, to recognize a disconnect and to send a disconnect potential over trunk 3T0. Moreover since the disconnect equipment is utilized in common by terminating calls and by disconnect, it is necessary to provide a lockout between the two types of usage. This is accomplished as described above by the relays 11TP0–9 and the preference relays 9VGP0–9. If any one of the relays 9VGP0–9 is operated, the operation of relays 11TP0–9 during disconnect is delayed and if any one of relays 11TP0–9 is operated, the operation of relays 9VGB0–9 is delayed.

The concentrator system of the present invention incorporates the dial-tone lockout feature of the No. 5 crossbar system described in the above-identified patent to Busch wherein a dial-tone call will not be started if a call is being served in the control 290. Also if a terminating call to the concentrators C0–9 obtains possession of the control 290 after a dial-tone call is started and operates one of the relays 9VGB0–9 before dial-tone call progresses to operate one of the trunk preference relays 11TP0–9, the request for the dial-tone marker 1305 will be cancelled. This results from the fact that common signal leads are utilized and are given preference for use on terminating calls as described above.

Terminating call

In order that mutual lockout due to common usage of signaling leads may not exist between originating and terminating calls that occur simultaneously within the same concentrator separate originating and terminating control equipment is used at the central office. Also all calls are treated as terminating calls when establishing the connection at the concentrators C0–9. Transmission of information from the concentrators C0–9 is limited to passing the calling line number which is registered by the marker 1305. Thereafter the call is treated as a terminating call. A terminating call to concentrator lines 1S00–47, 5S00–47, etc. is completed by the marker 1305 in a manner very similar to that employed for a regular line described in the above-identified patent to Busch appearing on the line link frame. The marker 1305 operates one of the relays 9VGB0–9 under control of the associated one of the relays 9VGP0–9, one of the horizontal group relays 6HG0–9 and one of the vertical file relays 6VF0–4 which complete a circuit for operating the transfer relays 6TR0 and 3TR. The line number is then transmitted to the concentrator C0 and the number group relays 3E0–5 and 3U0–7 are operated as described above. The operation of the number group and transfer circuit 300 connects the line busy relay 12LB in the circuit 1200 to the winding of the cut-off relay 2C00–47 which is associated with the called one of lines 1L00–47. If the called line is busy the associated one of the cut-off relays 2C00–47 is operated so that when relay 12LB is connected thereto it operates as well. The operation of the relay 12LB opens the circuit to the line hold relay 12LH and returns ground over the leads 6LH0–4 corresponding in number to that of the operated one of the vertical file relays 6VF0–4, to the marker 1305. This indicates to the marker 1305 that the line is busy. The marker 1305 thereupon dismisses the control 290 and the concentrator C0 and proceeds to return the line busy tone to the calling subscriber.

If the called line is idle, the line busy relay 12LB remains non-operated. After waiting a predetermined interval normally required to permit the hold relay 12LH to release and the select magnet fingers to stop vibrating in case the line just became idle, the marker 1305 applies ground for operating the line hold relay 12LH. During this time delay, the marker 1305 applies battery to operate a selected one of the relays 12SM0–9 which are associated with the idle links 3T0–9. The operated one of relays 12SM0–9 operates its associated one of the select magnets 11SEL0–9 on the frame 11LLF and in conjunction with the operated line hold relay 12LH applies positive battery over the selected trunk towards the concentrator C0. This operates the associated one of trunk relays 1TK0–9 and closes the crosspoints, or operates the trunk circuits 1T0–9, in a similar manner as described above for an originating call. In general, therefore, the sequence of operations for a terminating call is quite similar to that of a call-back call.

No-test and class of service

Class of service is provided on a per line basis as indicated in the control circuit 1100. A cross-connection may be made from any one of the line terminals 0–47 for each of the concentrators C0–9 to any one of the 30 class-of-service terminals marked 0–29.

No-test calls provide direct access to the subscriber lines 1L00–47 whether they are idle or busy for testing or for operator verification. No-test calls to idle lines are completed in a similar manner as terminating calls described above and the no-test relay 12NT is operated by the marker 1305. On no-test calls to busy lines the call proceeds as a terminating call up to the point where a line busy test is made. The relay 12LB operates and in conjunction with the relay 12NT locks to +130 volt battery 12B4 and applies +130 volts to lead 3C5 to the concentrator C0. Battery 12B4 is connected through lamp 12IN1, the normal armature 4 of relay 12LH, the operated armature 3 of relay 12NT, the operated armature 5 of relay 12LB, resistor 12R2 and the winding of relay 12LB to battery 12B2 and from the operated armature 5 of relay 12LB through the operated armature 4 of relay 12LB, the operated armature 2 of relay 12NT, the operated armature 4 of relay 9VGB0 to the lead 3C5. The circuit is extended in the concentrator C0 through the operated armature 5 of relay 3TR to the armatures 10 of relays 3E0–5. Suppose for example the no-test call is for line 1L00 and therefore the number group relays 3E0 and 3U0 are operated. The path from lead 3C5 is then extended through the operated armature 10 of relay 3E0, the operated armature 10 of relay 3U0 to the winding of relay 2C00 and also through the operated one of the trunk circuits 1T0–9 to the winding of the associated one of the no-test relays 3NT0–9. If trunk 3T0 is the busy trunk for line 1L00, the connection is through the operated armature 4 of relay 1TE00 and the operated armature 6 of relay 1TU00 to the grounded winding of relay 3NT0. Relay 2C00 remains operated and relay 3NT0 is operated by the positive potential from the central office. The relay 3NT0 operates and closes a ground through its armature 4 to operate the relay 3NTA and also closes ground to selected one of the control leads 3C2–4 preparatory to transmitting the identity of the trunk number in a two-out-of-five code to the central office. Relay 3NTA, which is connected to battery 3B20, operates and releases any operated relays in the line lockout and identifier circuit 201 by disconnecting battery 3B18 at its armature 1, and it opens the transfer circuit through the control lead 3C6 at its armature 3.

When the transfer circuit through control lead 3C6 is opened, relays 3L0, 3TR and 6TR0 release. Relay 3NT0 which was operated as described above over a path through the operated armatures 5 of relays 6TR0 and 3TR does not release but remains operated through a locking path from the operated armature 3 of relay 3NT0, control lead 3C5, the operated armature 4 of relay 9VGB0, the operated armature 2 of relay 12NT, the operated armatures 4 and 5 of relay 12LB, the operated armature 3 of relay 12NT, the normal armature 4 of relay 12LH, and lamp 12IN1 to battery 12B4. When the relay 6TR0 in the transfer circuit 6T0 releases, the no-test transfer relay 9NTR0 in the signal circuit 9SIG0 operates and transfers the control leads 3C2–4 to the two-out-of-five no-test relays 14NT0, 14NT1, 14NT2, 14NT4 and 14NT7 which record the number of the line link or trunk 3T0 as transmitted from the concentrator C0. The operating path for relay 9NTR0 is from ground through the operated armature 4 of relay 12NT, the operated armature 6 of relay 12LB, the operated armature 3 of relay 9VGB0, the normal armature 6 of relay 6TR0, and the winding of relay 9NTR0 to battery 9B1. When relay 9NTR0 operates, it transfers the leads 6L2–4 to the windings of relays 14NT0, 14NT1, 14NT2, 14NT4 and 14NT7 in the translator circuit 1400. The windings of relays 14NT0 and 14NT1 are shunted by the diode network 14D3 and the relays 14NT2 and 14NT3 by the diode network 14D4 which are similar to the diode network 14D1 described above. Relay 14NT7 is shunted by diode 14V6 and connected in series with the diode 14V5. Each of the relays 14NT0, 14NT1, 14NT2, 14NT4 and 14NT7 are also connected to the alternating-current source 14AC2.

When relay 3NT0 in the concentrator C0 operated, as briefly described above, it connected ground through its operated armatures 1 and 2 to the diodes 3D2 and 3D4 so that when relay 9NTR0 operates operating paths are provided for the relays 14NT7 and 14NT4. The operating path for relay 14NT7 is from source 14AC2, through the winding of relay 14NT7, the diode 14V5, the operated armature 3 of relay 9NTR0, lead 6C4, the normal armature 4 of relay 6TR0, lead 3C4, the normal armature 4 of relay 3TR, diode 3D2, and the operated armature 2 of relay 3NT0 to ground. The operating path for relay 14NT4 is from source 14AC2, the winding of relay 14NT4, diode 14V4 of network 14D4, the operated armature 2 of relay 9NTR0, lead 6L3, the normal armature 3 of relay 6TR0, lead 3C3, the normal armature 3 of relay 3TR, diode 3D4, and the operated armature 1 of relay 3NT0 to ground. The signal or operating ground for the no-test relays in the translator 1400 is provided by the operation of the relays 9NT0–9 in accordance with the chart shown in Fig. 20. For an 0 indication, relay 3NT0 as described above operates relays 14NT4 and 14NT7.

The operation of two out of five of the no-test relays in the translator 1400 translates the signals supplied by the concentrator to a decimal indication which is supplied to the marker 1305. When the marker received the line busy indication described above it applied a positive potential of approximately 10 volts to the lead 6LH0. When relays 14NT4 and 14NT7 in the translator operate the 10 volts on lead 6LH0 is connected through the operated armature 9 of relay 6VF0, the operated armature 2 of relay 12LB, the normal armature 1 of relay 12LH grounded by resistor 12R1 through the normal armature of relay 14NT0, the normal armature 2 of relay 14NT1, the normal armature 1 of relay 14NT2, the operated armature of relay 14NT4, the operated armature 2 of relay 14NT7, lead 14LL0 through cable 13C5 to the connector 1301 and therefrom through cable 13C10 to the marker 1305.

When the marker 1305 recieves the identification of the busy trunk 3T0 it operates the no-test connector 1304 through cable 13C14 to connect it through cable 13C8 to the trunk control circuit 1100 in the signal circuit 9SIG0. The connector 1304 applies ground through cable 13C8, lead 11H, the back contact of the normal armature of relay 12NTH, the operated armature 1 of relay 12NT, the operated armature 1 of relay 12SM0, the 0 armature A of relay 9VGB0, and the winding 11NTC0 to its associated battery 11B3 causing relay 11NTC0 to operate. When relay 11NTC0 operates, it connects the link leads 11T0, 11R0 and 11SL0 directly through leads 11T, 11R and 11S in cable 13C8 to the no-test connector circuit 1304. The no-test connection through cable 13C8 is in this manner bridged across the line-to-trunk connection from line 1L09 through trunk 3T0, the frame 11LLF and cable 13C7 to the trunk frame 1303. When relay 11NTC0 operates, it also causes the operation of the relay 12NTH by extending its operating path through its operated armature 4 to the winding of relay 12NTH. When relay 12NTH operates, it locks to ground through lead 11H, extends its locking ground for the relay 11NTC0 and prevents the other no-test connector relays 11NTC1–9 from being operated while the no-test connector 1304 is in use by opening their operating paths through the normal back contact of relay 12NTH. In the No. 5 crossbar system disclosed in the above-identified Busch patent two instead of one no-test connectors are utilized for a line link frame. The relay 12NTH in this manner locks the relay 11NTC0 to the no-test connector 1304 under control of the latter circuit and independently of the line link control circuit 1100 or the connector circuit 1200. The marker 1305 disconnects from the connector 1304 a predetermined interval after connecting it to the trunk 3T0. When the marker disconnects it releases relays 12SM0, 12NT, 6VF0, 6HG0 and 9VGP0. When relay 9VGP0 releases, it in turn releases relay 9VGP0, and when relay 12NT releases it removes the source 12B4 from lead 3C5 allowing relay 3NT0 to release. When relay 3NT0 releases it removes the signaling grounds to release relays 14NT4 and 14NT7 in the translator circuit 1400. When relay 9VGB0 releases it opens the operating path for relay 9NTR0 causing it to release. When relays 6VF0 and 6HG0 releases, the operating path for relay 12LB is opened causing it to release. Only the relays 2C00, 1TE00 and 1TU00 in concentrator C0 and relays 11NTC0, 11S0, and 11SR0, and one of the hold magnets 11HM0–9 in the central office remain operated. The relay 11NTC0 as described above is held operated under control of the connector 1304 and the other relays remain operated until disconnect also as described above.

It is to be understood that the above-described arrangements are illustrative of the application of the principles of this invention. Numerous other arrangements may be devised by those skilled in the art without departing from the spirit and scope of the invention.

What is claimed is:

1. A line concentrator telephone system comprising a plurality of subscriber lines; a central office; a plurality of talking trunks less in number than said plurality of lines and extending from said central office; a plurality of control trunks less in number than said plurality of talking trunks and extending from said central office; a line concentrator connected to said talking trunks, to said control trunks and to said subscriber lines for connecting said subscriber lines with said talking trunks; signal means at said concentrator responsive to the calling condition of any one of said lines for transmitting over said control trunks to said central office alternating-current simplex signals representing the identity of said calling line; control means at said central office controlled by said signal means for selecting an idle one of said talking trunks and for concurrently transmitting over said control trunks and over said selected trunk to said concentrator direct-current signals representing the identity of said calling line and the identity of said selected trunk; and circuit means at said concentrator individual to each of said talking trunks and controlled by said control means for establishing a connection between said selected trunk and said calling line.

2. A line concentrator telephone system in accordance with claim 1 wherein said control trunks consist of six control leads, the first five of said leads being utilized by said signal means for transmitting said alternating-current simplex signals to said control means at said central office.

3. A line concentrator telephone system in accordance with claim 2 wherein said signal means and said control means together include transfer circuit means connected together by the sixth of said control leads for transferring said first five control leads for a central office-to-concentrator signaling operation.

4. A line concentrator telephone system in accordance with claim 2 wherein the first four of said control leads are utilized by said control means for transmitting said direct-current signals.

5. A line concentrator telephone system in accordance with claim 4 wherein said control means includes means connectable to the fifth of said control leads for registering a line busy indication and wherein said concentrator comprises means for providing a line busy indication over said fifth control lead.

6. A line concentrator telephone system in accordance with claim 4 comprising in addition means at said central office responsive to the initiation of a terminating call to one of said subscriber lines for operating said control means to select an idle one of said talking trunks and for concurrently transmitting direct-current signals representing the identity of said called line over said first four control leads and a connect potential over said selected talking trunk; and wherein said control means comprises means operative through the sixth of said leads for transferring said first five leads for a central office-to-concentrator signaling operation and comprising in addition means connectable from said central office to said concentrator by said transfer to the fifth of said control leads; means for registering a line busy condition of said called line.

7. A line concentrator telephone system comprising a central office; a concentrator remote from said central office; a plurality of subscriber lines at said concentrator; a plurality of talking trunks connecting said central office and said concentrator; control paths connecting said central office and said concentrator; a source of alternating-current potential at said central office; a signal means at said concentrator operable in conjunction with said source for transmitting through said control paths to said central office alternating-current simplex signals representing the identity of any one of said lines; means at said concentrator for connecting any one of said lines to any one of said trunks; means at said central office for selecting any idle one of said trunks; and rapid signaling means at said central office controlled by said selecting means and by said signal means for operating said connecting means at said concentrator.

8. In combination a remote concentrator and a central office, a relatively low power and slow signaling means at said concentrator, a relatively high power and rapid signaling means at said central office, a plurality of subscriber lines connected to said concentrator, a plurality of trunks less in number than said plurality of said lines connecting said concentrator and said central office, and means including both of said signaling means for establishing a connection between a calling one of said lines and an idle one of said trunks.

9. A telephone system comprising a plurality of subscriber telephones, a satellite office, a subscriber line connecting each of said telephones to said satellite office, a central office remote from said satellite office, a plurality of trunks connecting said satellite office to said central office, the number of said trunks being less than the number of said subscriber lines, switching means within said satellite office for connecting any one of said trunks to any one of said subscriber lines, switch controller means in said satellite office determining the operation of said switching means, said controller means being operated responsive to reception of coded information from said central office, to determine a particular operation of said switching means transmitting means within said central office for sending to said switch controller means coded information corresponding to the code of a particular one of said subscriber lines, a line lockout and identifier circuit at said satellite office responsive upon the initiation of a calling condition on any one of said subscriber lines for identifying said calling line and for locking out all the other of said subscriber lines, transmitting means at said satellite office controlled by said line lockout and identifier circuit for transmitting to said central office a coded representation of the identity of said calling line, information receiving means in said central office for receiving said signal from said satellite office transmitting means, and means in said central office responsive to the operation of said information receiving means for selecting an idle one of said trunks and for initiating the operation of said central office transmitting means.

10. A telephone system in accordance with claim 9 comprising in addition a plurality of control leads connecting said satellite office with said central office, transfer means in said central office for connecting said control leads to said central office transmitting means, transfer means at said satellite office for connecting said control leads to said concentrator transmitting means, and means at said central office controlled by said means responsive to the operation of said information receiving means for operating said central office transfer means and said concentrator transfer means.

11. In a telephone system, a central office; a group of subscriber lines; a line relay individual to each of said lines; a plurality of trunk circuits serving said subscriber lines and located at a distance from said central office; a plurality of trunks connecting said trunk circuits with said central office; common operating means associated with said trunk circuits; means in said central office for selecting an idle one of said trunks and for controlling said trunk circuits to connect one of said lines with said central office over said selected trunk; and means to operate said selecting and controlling means under control of an operated one of said line relays including means associated with said line relays for transmitting the identity of an operated one of said line relays to said central office, means in said central office to register the transmitted designation of one of said line relays, and means for operating said selecting and controlling means under the control of said registering means, said selecting and controlling means including means for rapidly transmitting the identity of said operated line relay to said common operating means, said rapid transmitting means being faster than said transmitting means associated with said line relays.

12. In a telephone system, a central office; a group of subscriber lines; a line relay individual to each of said lines; a plurality of trunk circuits serving said subscriber lines and located at a distance from said central office; a plurality of trunks connecting said trunk circuits with said central office; common operating means associated with said trunk circuits; means in said central office for selecting an idle one of said trunks and for controlling said trunk circuits to connect one of said lines with said central office over said selected trunk; means to operate said selecting and controlling means under control of an operated one of said line relays including means associated with said line relays for transmitting the identity of an operated one of said line relays to said central office, means in said central office to register the transmitted designation of one of said line relays, and means for operating said selecting and controlling means under the control of said registering means; control leads connecting said transmitting means and said common operating means with said central office; said selecting means comprising means for supplying a connecting direct-current potential over both sides of said selected trunk, and means for supplying direct-current coded signals over said control leads to said common operating means; and disconnect means at said central office for inhibiting said coded signal supplying means but not said connecting potential supplying means to cause the operated one of said trunk circuits to disconnect said selected trunk from said line connected thereto.

13. In a telephone system in accordance with claim 12 wherein said transmitting means includes positive and negative current inhibiting means connected to said control leads and includes means for grounding selected ones of said inhibiting means and wherein said register means includes an alternating-current source and register devices connected to said control leads and said source to provide for alternating-current simplex signaling system from said transmitting means to said registering means.

14. A line concentrator telephone system comprising a central office; a concentrator remote from said central office; a plurality of subscriber lines at said concentrator; a plurality of talking trunks connecting said central office and said concentrator; control paths connecting said central office and said concentrator; a source of alternating-current potential at said central office; signal means at said concentrator operable in conjunction with said source for transmitting alternating-current simplex signals representing the identity of any one of said lines over said control paths to said central office; means at said concentrator for connecting any one of said lines to any one of said trunks; means at said central office for selecting any idle one of said trunks; rapid signaling means at said central office controlled by said selecting means and by said signal means for operating said connecting means at said concentrator comprising means for connecting said control paths to said connecting means, and means for simultaneously providing a connect potential over both sides of said selected trunk and direct-current coded signals through said control paths to said connector means; disconnect means at said central office for providing a disconnect potential similar to said connect potential over both sides of selected trunk without connecting said control paths to said connecting means.

15. A remote line concentrator telephone system comprising a plurality of telephones, a subscriber line associated with each of said telephones, a central office, a plurality of trunks extending from said central office, switching means defining talking path crosspoints between any one of the subscriber lines and any one of said trunks, a plurality of control leads extending from said central office, alternating-current simplex signal means associated with said switching means and connected to said control leads for transmitting to said central office coded signals representing the identity of one of said lines, a register at said central office building, a source of alternating current connected to said control leads, means responsive to the operation of said register means for selecting an idle one of said trunks, a common control circuit at said central office controlled by said register means and by said selecting means for disconnecting said control leads from said register means and from said signal means and also for providing direct-current coded signals over said control leads to control the operation of said switching means.

16. In a telephone system, a central office; a plurality of concentrator units remotely located from said central office; a plurality of trunks connecting each of said concentrator units with said central office; a plurality of subscriber stations connected to each of said concentrator units, said concentrator units each comprising a crosspoint trunk circuit for each of said associated trunks for providing a connection between any one of said associated stations and one of said associated trunks, an identifying and signaling circuit for identifying a calling one of said lines and for transmitting the identity thereof to said central office, and a number group circuit to control the operation of said trunk circuits; said central office comprising a common control circuit and a plurality of signal circuits associated individually with said concentrator units, said control circuit comprising means for registering said signals from said concentrator unit and means controlled by said register means for selecting an idle one of said trunks and for supplying direct-current coded signals representing the identity of said calling station to said number group circuit, said signal circuit comprising means controlled by said selecting means for applying a connect potential over said selected trunk to said trunk circuit associated therewith, means for locking out all of said concentrator units except the said concentrator unit to which said calling station is connected, and means for establishing a preference for terminating calls over originating calls, said control circuit also comprising terminating circuit means for servicing a call to one of said stations by selecting an idle one of said trunks and for supplying direct-current coded signals representing the identity of a wanted one of said stations to said number group circuit.

17. A line concentrator telephone system comprising a plurality of subscriber lines; a central office; a plurality of talking trunks less in number than said plurality of lines and extending from said central office; a plurality of control trunks less in number than said plurality of talking trunks and extending from said central office; a line concentrator connected to said talking trunks, to said control trunks and to said subscriber lines for connecting said subscriber lines with said talking trunks; signal means at said concentrator responsive to the calling condition of any one of said lines for transmitting to said central office alternating-current simplex signals over said control trunks representing the identity of said calling line; control means at said central office controlled by said signal means for selecting an idle one of said talking trunks and for concurrently transmitting to said concentrator over said control trunks and said selected trunk direct-current signals representing the identity of said calling line and the identity of said selected trunk; circuit means at said concentrator individual to each of said talking trunks and controlled by said control means for establishing a connection between said selected trunk and said calling line; and disconnect means at said central office responsive to a disconnect condition on said calling line for transmitting direct-current signals over said selected trunk to said line concentrator while preventing the transmission of any signals over said control trunks for controlling said circuit means to disconnect said calling line from said selected trunk.

18. In a telephone system, a central office; a group of subscriber lines; a line relay individual to each of said lines; a plurality of trunk circuits serving said subscriber lines and located at a distance from said central office; a plurality of trunks connecting said trunk circuits with said central office; common operating means associated with said trunk circuits; means in said central office for selecting an idle one of said trunks and for controlling said trunk circuits to connect one of said lines with said central office over said selected trunk, comprising means for supplying a connecting direct-current potential over both sides of said selected trunk, means for supplying direct-current coded signals over said control leads to said common operating means, and means to operate said selecting and controlling means under control of an operated one of said line relays including means associated with said line relays for transmitting the identity of an operated one of said line relays to said central office; means in said central office or registering the transmitted designation of one of said line relays; means for operating said selecting and controlling means under the control of said registering means; control leads connecting said transmitting means and said common operating means with said central office; disconnect means at said central office for inhibiting said coded signal supplying means but not said connecting potential supplying means for causing the operated one of said trunk circuits to disconnect said selected trunk from said line connected thereto; and preference circuit means at said central office for preventing the operation of said disconnect means during the operation of said selecting means.

19. In a telephone system in accordance with claim 18 comprising in addition preference circuit means at said central office for preventing the operation of said selecting means during the operation of said disconnect means.

20. A line concentrator telephone system comprising a plurality of subscriber lines; a central office; a plurality of talking trunks less in number than said plurality of lines and extending from said central office; a plurality of control trunks less in number than said plurality of talking trunks and extending from said central office; a line concentrator connected to said talking trunks, to said control trunks and to said subscriber lines for connecting said subscriber lines with said talking trunks; signal means at said concentrator responsive to the calling condition of any one of said lines for transmitting over said control trunks to said central office alternating-current simplex signals representing the identity of said calling line; control means at said central office controlled by said signal means for selecting an idle one of said talking trunks and for simultaneously transmitting to said concentrator over said control trunks and said selected trunk direct-current signals representing the identity of said calling line and the identity of said selected trunk; circuit means at said concentrator individual to each of said talking trunks and controlled by said control means for establishing a connection between said selected trunk and said calling line; terminating, no-test and call-back circuit means at said central office for controlling said control means; no-test signaling means at said line concentrator for providing over said control trunks alternating-current coded signals representing the identity of said selected trunk; and a no-test circuit connector controlled by said signals from said no-test signaling means for establishing a bridging connection to said selected trunk.

21. In a telephone system, a line concentrator, a plurality of subscriber lines connected to said concentrator, a central office, a plurality of trunks less in number than said plurality of lines and interconnecting said concentrator and said central office, means at said central office for selecting any one of said trunks, means at said concentrator for establishing a connection from any one of said lines to said selected trunk, and means for establishing a connection to any one of said lines independently of the service condition of said lines.

22. A line concentrator telephone system comprising a central office, a concentrator remote from said central office, a relatively large plurality of subscriber lines connected to said concentrator having idle, busy and service request conditions, a relatively small plurality of talking trunks connecting said concentrator to said central office, means at said concentrator responsive upon the initiation of a service request condition on any one of said lines for signaling the identity of said line to said central office, means at said central office responsive upon the reception of said line identifying signals for selecting any one of said trunks, means at said concentrator for connecting any one of said lines to any one of said trunks, signal means at said central office controlled by said selecting means for controlling said connecting means to connect said service requesting line to said selected trunk, and no-test circuit means at said central office for controlling said connecting means to connect any one of said lines in said idle condition to an idle one of said trunks and for establishing a bridging connection to any one of said lines in said busy condition.

23. In a telephone system, a line concentrator, a plurality of subscriber lines connected to said concentrator, a central office, a plurality of trunks less in number than said plurality of lines and interconnecting said concentrator and said central office, means at said central office for selecting any one of said trunks, means at said concentrator for establishing a connection from any one of said lines to said selected trunk, and means for establishing a no-test connection to any one of said lines independently of the service condition of said lines.

24. In a telephone system in accordance with claim 23 wherein said no-test connection means includes means for determining the service condition of any one of said lines, means controlled by said determining means for connecting said line to be tested to an idle trunk when said line is idle, means controlled by said determining means for signaling the identity of one of said trunks connected to said line to said central office when said line is busy, and means at said central office controlled by said trunk identifying signals for establishing a bridging no-test connection to said identified trunk whereby a connection is provided to said line.

25. A line concentrator telephone system comprising a plurality of subscriber lines; a central office; a plurality of talking trunks less in number than said plurality of lines and extending from said central office; a plurality of control trunks less in number than said plurality of talking trunks and extending from said central office; a line concentrator connected to said talking trunks, to said control trunks and to said subscriber lines for connecting said subscriber lines with said talking trunks; signal means at said concentrator responsive to the calling condition of any one of said lines for transmitting to said central office over said control trunks to alternating-current simplex signals representing the identity of said calling line; control means at said central office controlled by signal means for selecting an idle one of said talking trunks and for simultaneously transmitting direct-current signals over said control trunks and said selected trunk to said concentrator representing the identity of said calling line and the identity of said selected trunk; circuit means at said concentrator individual to each of said talking trunks and controlled by said control means for establishing a connection between said selected trunk and said calling line; and means at said central office for checking the establishment of a connection between said selected trunk and said calling line.

26. In a telephone system, a line concentrator, a plurality of subscriber lines connected to said concentrator, a central office, a plurality of trunks less in number than said plurality of lines interconnecting said concentrator and said central office, means at said central office for selecting any one of said trunks, means at said concentrator for establishing a connection from any one of said lines to said selected trunk, and means at said central office responsive upon the operation of said connecting means for automatically checking the establishment of a connection between one of said lines and one of said trunks.

27. In a telephone system, a line concentrator, a plurality of subscriber lines connected to said concentrator, a central office, a plurality of trunks less in number than said plurality of lines interconnecting said concentrator and said central office, means at said central office for selecting any one of said trunks, means at said concentrator for establishing a connection from any one of said lines to said selected trunk, means at said central office responsive upon the operation of said connecting means for automatically checking the establishment of a connection between one of said lines and one of said trunks, and means for establishing a no-test connection to any one of said lines independent of the service condition of said lines.

28. A line concentrator telephone system comprising a plurality of subscriber lines; a central office; a plurality of talking trunks less in number than said plurality of lines and extending from said central office; a plurality of control trunks less in number than said plurality of talking trunks and extending from said central office; a line concentrator connected to said talking trunks, to said control trunks and to said subscriber lines for connecting said subscriber lines with said talking trunks; signal means at said concentrator responsive to the calling condition of any one of said lines for transmitting to said central office over said control trunks alternating-current simplex signals representing the identity of said calling line; control means at said central office controlled by said signal means for selecting an idle one of said talking trunks and for simultaneously transmitting to said concentrator over said control trunks and said selected trunk to said concentrator direct-current signals representing the identity of said calling line and the identity of said selected trunk; circuit means at said concentrator individual to each of said talking trunks controlled by said control means for establishing a connection between said selected trunk and said calling line; means at said central office responsive upon the operation of said control means for supplying dial tone to said selected trunk; means for establishing a call-back connection to said calling line including means for disconnecting said selected trunk from said calling line and for removing dial tone from said selected trunk, and means for reoperating said control means whereby another idle one of said trunks is connected to said calling line.

29. A line concentrator telephone system comprising a central office, a line concentrator, a plurality of lines extending from said concentrator, a plurality of talking trunks interconnecting said concentrator and said central office, means at said concentrator for signaling the identity of any one of said lines requesting service to said central office, means at said central office controlled by said signal means for selecting and connecting an idle one of said trunks to said service requesting line, an originating call register at said central office, means controlled by said selecting and connecting means for connecting said register to said selected idle trunk for supplying dial tone to said service requesting lines, at least one outgoing trunk, call-back circuit means controlled by said register for disconnecting the line-to-register connection through said selected trunk, and means responsive upon the operation of said circuit means for selecting and connecting one end of another idle one of said talking trunks to said service requesting line and the other end to said outgoing trunk.

30. A line concentrator telephone system comprising a plurality of multiparty subscriber lines; a central office; a plurality of talking trunks less in number than said plurality of lines and extending from said central office; a plurality of control trunks less in number than said plurality of talking trunks and extending from said central office; a line concentrator connected to said talking trunks, said control trunks and to said subscriber lines for connecting said subscriber lines with said talking trunks; signal means at said concentrator responsive to the calling condition of any one of said lines for transmitting to said central office over said control trunks alternating-current simplex signals representing the identity of said calling multiparty line; control means at said central office controlled by said signal means for selecting an idle one of said talking trunks and for simultaneously transmitting to said concentrator over said control trunks and said selected trunk direct-current signals representing the identity of said calling multiparty line and the identity of said selected trunk; circuit means at said concentrator individual to each of said talking trunks and controlled by said control means for establishing a connection between said selected trunk and said calling multiparty line; terminating means at said central office for operating said control means to control the establishment of a connection to one of said multiparty lines; and means which does not interfere with the operation of said circuit means for supplying coded ringing tone to said terminating multiparty lines.

31. In combination a remote suboffice and a central office, a relatively slow signaling means at said suboffice, a relatively rapid signaling means at said central office, a plurality of subscriber lines connected to said suboffice, a plurality of trunks connecting said suboffice and said central office, and means including both of said signaling means for establishing a connection between a calling one of said lines and an idle one of said trunks.

References Cited in the file of this patent

UNITED STATES PATENTS

| | | |
|---|---|---|
| 2,402,446 | Powell | June 18, 1946 |
| 2,532,097 | Hersey | Nov. 28, 1950 |
| 2,715,657 | Andrews | Aug. 16, 1955 |
| 2,724,746 | Bruce et al. | Nov. 22, 1955 |